US012734446B2

(12) United States Patent
Ishigaki et al.

(10) Patent No.: US 12,734,446 B2
(45) Date of Patent: Sep. 15, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Shohei Ishigaki, Tokyo (JP); Takuya Ishida, Tokyo (JP); Yu Kashiwase, Tokyo (JP)

(73) Assignee: CYGAMES, INC., Tokyo (JP)

( * ) Notice: Subject to any disclaimer, the term of this patent is extended or adjusted under 35 U.S.C. 154(b) by 275 days.

(21) Appl. No.: 18/587,286

(22) Filed: Feb. 26, 2024

(65) Prior Publication Data

US 2024/0189717 A1 Jun. 13, 2024

Related U.S. Application Data

(63) Continuation of application No. PCT/JP2022/030788, filed on Aug. 12, 2022.

(30) Foreign Application Priority Data

Aug. 27, 2021 (JP) ................................ 2021-139143

(51) Int. Cl.
*A63F 13/54* (2014.01)
*A63F 13/52* (2014.01)
(Continued)

(52) U.S. Cl.
CPC .............. *A63F 13/54* (2014.09); *A63F 13/52* (2014.09); *A63F 13/814* (2014.09); *A63F 13/533* (2014.09)

(58) Field of Classification Search
CPC ........ A63F 13/54; A63F 13/52; A63F 13/814; A63F 13/533
(Continued)

(56) References Cited

U.S. PATENT DOCUMENTS

2009/0258700 A1* 10/2009 Bright ..................... A63F 13/44 463/31
2024/0189717 A1* 6/2024 Ishigaki .................. A63F 13/52

FOREIGN PATENT DOCUMENTS

JP 2004208944 A 7/2004

OTHER PUBLICATIONS

Game software for Nintendo Switch "Hatsune Miku Project DIVA MEGA 39's" released on Feb. 13, 2020, https://miku.sega.jp/mega39s/ (7 pages).

(Continued)

*Primary Examiner* — Pierre E Elisca
(74) *Attorney, Agent, or Firm* — Osha Bergman Watanabe & Burton LLP

(57) ABSTRACT

A non-transitory computer readable medium stores a program causing a computer to execute: processing for generating a playlist that includes a plurality of pieces of song identification information; processing for setting display object information in association with each of the plurality of pieces of song identification information included in the playlist, based on an operation input of a player; processing for continuously playing back a plurality of songs corresponding to the plurality of pieces of song identification information included in the playlist; and processing for displaying and controlling an image during the continuous playback, based on the display object information associated with the song identification information.

9 Claims, 32 Drawing Sheets

(51) Int. Cl.
*A63F 13/533* (2014.01)
*A63F 13/814* (2014.01)

(58) Field of Classification Search
USPC .......................................................... 463/31
See application file for complete search history.

(56) References Cited

OTHER PUBLICATIONS

Video "Hatsune Miku Project DIVA MEGA 39's! Soon to be released! Check out the official live stream!" which has been live-streamed on YouTube on Feb. 12, 2020, https://www.youtube.com/watch?v=5mlRix3Wt11 (2 pages).
Web article "Live stream just before release of 'Hatsune Miku Project DIVA MEGA 39's' will be broadcast on Feb. 12 (Wed.)!" of "Weekly DIVA Station" posted on Feb. 5, 2020, https://web.archive.org/web/20200216190848/https://info.miku.sega.jp/15173 (4 pages).
Web article "Containing a new song written by kz(livetune)! Play report before release of 'Hatsune Miku Project DIVA MEGA 39's'! Even rhythm game beginners can enjoy with two game modes and dress-up elements!" of "animate Times" posted on Feb. 7, 2020, https://web.archive.org/web/20200303232718/https://www.animatetimes.com/news/details.php?id=1580826035 (2 pages).
[Live Play by partygame] Hatsune Miku: Project DIVA MEGA39's Part 2 (Mix Mode and Customization), YouTube [online] [video], Feb. 14, 2020 <https://www.youtube.com/watch?v=zfmTfzYPrTY> With partial translation (10 pages).
[Otaku Enjoys Playing] Hatsune Miku: Project DIVA MEGA39's [Mokuroku Shindo Shirube], YouTube [online] [video], Jun. 6, 2021 <https://www.youtube.com/watch?v=UoVURvRULYg> With partial translation (4 pages).
System All-Star Live The Idolm@Ster One for All, Namco Bandai Games official site [online], May 11, 2014 <https://web.archive.org/web/20140511030949/https://ofa.idolmaster.jp/system/live.php> With partial translation (3 pages).
All 765 Pro Members Gather!!! All-Star Live! [IM@S OFA] #4, YouTube [online] [video], Sep. 12, 2020 <https://www.youtube.com/watch?v=MYHORC4LdVA> With partial translation (6 pages).
"In 'Hatsune Miku: Project DIVA Extend,' It's Now Possible to Specify Module for Each Song in Playlist. Information on Newly Added Songs and New Modules Has Also Been Released.", Oct. 14, 2011, https://www.4gamer.net/games/132/G013229/20111011015/ (11 pages).
"[Deresute] New Live feature, 'MV Original Unit,' Has Been Added, Making It Easy to Set Singing Idols!", Apr. 25, 2017, https://appget.com/c/%E3%83%87%E3%83%AC%E3%82%B9%E3%83%86/307946/cinderella-191/ (6 pages).
"[Deresute] Divine Update That Allows Change into Favorite SSR Outfits! [Cinderella Girls Starlight Stage]", Dec. 13, 2019, https://www.youtube.com/watch?v=5jqNQAVGPXw (8 pages).
[Deresute] What is the MV playlist and where is it? Is it possible to change my costume? Dereken [online], Mar. 5, 2021, https://dereken.com/?p=1129 (8 pages).
Summarizing the bad points and improvement points of Deresute. How to become a Kamige? Tanage! [online], Feb. 1, 2018, https://tanage.hatenablog.jp/entry/2018/02/01/224019 (9 pages).
Shadowverse [Strategies] : Slot and falling holes of the deck construction, Appliv Games [online], Jun. 27, 2016, https://games.app-liv.jp/archives/145058 (7 pages).
Office Action issued in Japanese Application No. 2021-139143; Dated Feb. 22, 2022 (9 pages).
Office Action issued in Japanese Application No. 2021-139143; Dated Jun. 14, 2022 (6 pages).
Office Action issued in Japanese Application No. 2021-139143; Dated Oct. 31, 2023 (19 pages).
International Search Report issued in International Application No. PCT/JP2022/030788, mailed Sep. 13, 2022 (5 pages).
Written Opinion issued in International Application No. PCT/JP2022/030788; Dated Sep. 13, 2022 (4 pages).
[Delesta] Live Parade, 2020 running with New Gene, YouTube [online] [video], May 3, 2020; <https://www.youtube.com/watch?v=PVeW3RvvwF8 >; With partial translation (2 pages).
12/15 Milisita, Squista MV viewing, YouTube [online] [video] , 2020 Dec. 15, 2025; <https://www.youtube.com/watch?v=fhY1eMy35ms>; With partial translation (2 pages).

* cited by examiner

Song:XXXXXX
330b
RANDOM
330a
334
330b
336a
MV PLAYLIST
336
OK
332
26
300
HOME
party
LIVE
MENU
300a
300b
300c
300d

FIG.20
1
READ MV ORIGINALS
DO YOU WISH TO READ MV ORIGINAL PARTIES INTO ALL PARTIES?
IF READ, ALL PARTIES WILL BE OVERWRITTEN
CLOSE
READ
26
512
510

| | | PARTY ORGANIZATION INFORMATION | | | | |
|---|---|---|---|---|---|---|
| | | CHARACTER POSITION INFORMATION | | | | |
| | | POSITION 1 | | POSITION 2 | | ・・・ |
| SONG ORDER INFORMATION | SONG ID | CHARACTER ID | COSTUME ID | CHARACTER ID | COSTUME ID | ・・・ |
| 001 | aaaa | 0001 | 0002 | 0800 | 0033 | ・・・ |
| 002 | bbbb | 0203 | 0014 | 0162 | 0203 | ・・・ |
| 003 | cccc | 1006 | 0099 | 0005 | 0022 | ・・・ |
| ⋮ | ⋮ | ⋮ | ⋮ | ⋮ | ⋮ | |

FIG.25

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/030788, filed on Aug. 12, 2022, which claims priority to Japanese Patent Application No. 2021-139143, filed on Aug. 27, 2021, the entire contents of which are incorporated by reference herein.

BACKGROUND ART

Technical Field

The present invention relates to an information processing program, an information processing method, and an information processing system.

In the related art, a so-called rhythm game in which a touchscreen is operated along with a song is known. In the rhythm game, a game image is played back along with the song.

Furthermore, in order to improve the entertainment aspect of the rhythm game, a random playback technique has been developed in which a song is randomly determined from among a plurality of songs and is played back (for example, Patent Literature 1).

CITATION LIST

Patent Literature

Patent Literature 1: JP 2004-208944 A

SUMMARY OF INVENTION

Technical Problem

Incidentally, there are visual media productions called music videos (hereinafter, also referred to as MV) in which a worldview and a depiction of a song are formed into a video. Music videos are also created for game songs and are implemented in games, in some cases. Music video data (hereinafter, also referred to as MV data) to be implemented in a game includes background image data suited for a worldview and a depiction of a song, motion data for expressing motions of a single or a plurality of characters, and other data.

In a rhythm game in Patent Literature 1, in the case where a music video is provided for each song, the order of songs can be random, whereas a character (s) in the music video provided for each song is fixed for that song. Therefore, it is difficult to improve interest in rhythm games.

An object of the present invention is to provide an information processing program, an information processing method, and an information processing system capable of improving interest in a game.

Solution to Problem

In order to solve the above-described problem, the present invention provides an information processing program causing a computer to execute:

- processing for generating a playlist that includes a plurality of pieces of song identification information;
- processing for setting display object information in association with each of the plurality of pieces of song identification information included in the playlist, on the basis of an operation input of a player;
- processing for continuously playing back a plurality of songs corresponding to the plurality of pieces of song identification information included in the playlist; and
- processing for displaying and controlling an image during the continuous playback, on the basis of the display object information associated with the song identification information.

Furthermore, in the processing for displaying and controlling the image, the image may be displayed and controlled on the basis of song display information on the songs corresponding to the song identification information and display information on a display object based on the display object information.

Furthermore, the playlist may include order information indicating a playback order of the songs, and in the processing for continuously playing back, the plurality of songs may be continuously played back on the basis of the order information, and, upon the end of playback of each of the plurality of songs, playback of the song in the next playback order may be started.

Furthermore, in the processing for setting the display object information, setting of a plurality of pieces of display object information associated with the plurality of pieces of song identification information may be changed on the basis of a first operation input of the player.

Furthermore, in the processing for setting the display object information, identical display object information may be set in association with the plurality of pieces of song identification information on the basis of a second operation input of the player.

Furthermore, in the processing for setting the display object information, basic display object information that is set in advance in association with the plurality of pieces of song identification information may be set as the display object information, on the basis of a third operation input of the player.

Furthermore, in the processing for displaying and controlling the image, when playback of any of the plurality of songs is paused during the continuous playback, information related to the song corresponding to the song identification information and the display object information associated with the song identification information may be displayed on a display unit.

In order to solve the above-described problem, the present invention provides an information processing method that is executed by one or a plurality of computers, the information processing method including:

- processing for generating a playlist that includes a plurality of pieces of song identification information;
- processing for setting display object information in association with each of the plurality of pieces of song identification information included in the playlist, on the basis of an operation input of a player;
- processing for continuously playing back a plurality of songs corresponding to the plurality of pieces of song identification information included in the playlist; and
- processing for displaying and controlling an image during the continuous playback, on the basis of the display object information associated with the song identification information.

In order to solve the above-described problem, the present invention provides an information processing system that includes one or a plurality of computers, said one or the plurality of computers executing:

- processing for generating a playlist that includes a plurality of pieces of song identification information;
- processing for setting display object information in association with each of the plurality of pieces of song identification information included in the playlist, on the basis of an operation input of a player;
- processing for continuously playing back a plurality of songs corresponding to the plurality of pieces of song identification information included in the playlist; and
- processing for displaying and controlling an image during the continuous playback, on the basis of the display object information associated with the song identification information.

Effects of Disclosure

According to the present invention, it is possible to improve interest in a game.

BRIEF DESCRIPTION OF DRAWINGS

FIG. 25 is a view for explaining an example of a my MV playlist according to this embodiment.

DESCRIPTION OF EMBODIMENT

One aspect of an embodiment of the present invention will be described in detail below with reference to the accompanying drawings. The dimensions, materials, other specific values, etc. given in this embodiment are merely examples for facilitating understanding, and do not limit the present invention unless otherwise specifically mentioned. Note that, in this specification and the drawings, duplication of description will be omitted by assigning identical reference signs to elements that have substantially the same functions and configurations, and elements that are not directly related to the present invention are not shown.

[Overall Configuration of Information Processing System S]

Figure 1:
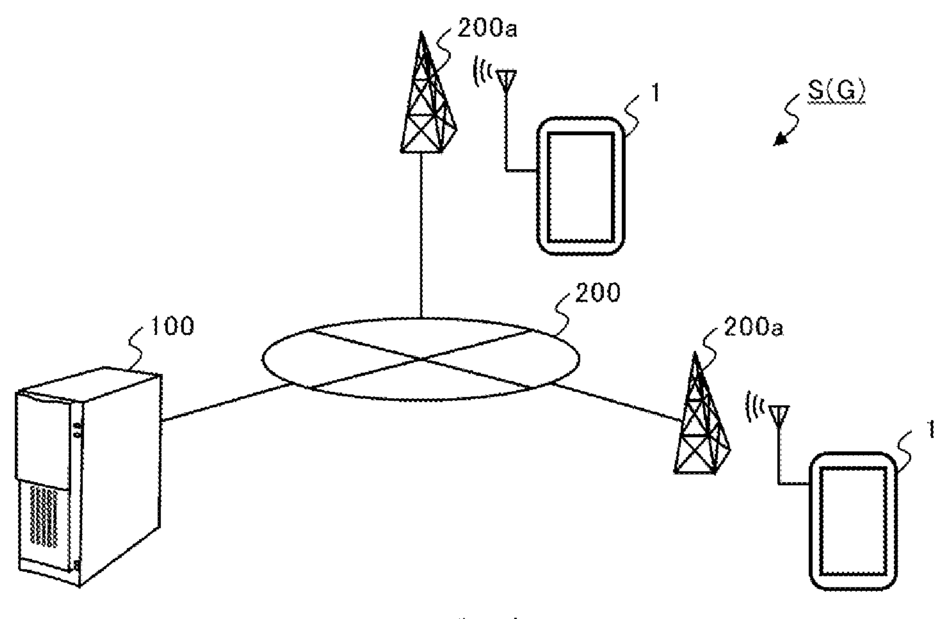
FIG. 1 is an explanatory view showing, in outline, the configuration of an information processing system.

FIG. 1 is an explanatory view showing, in outline, the configuration of an information processing system S. The information processing system S is a so-called client-server system that includes player terminals 1, a server 100, and a communication network 200 having communication base stations 200*a*.

Each of the player terminals 1 can establish communication with the server 100 via the communication network 200. The player terminals 1 include a wide range of electronic appliances that can be communicatively connected to the server 100 by wire or wirelessly. Examples of the player terminals 1 include smartphones, mobile phones, tablet devices, personal computers, game machines, or the like. In this embodiment, a description will be given of a case in which smartphones are used as the player terminals 1.

The server 100 is communicatively connected to the plurality of player terminals 1. The server 100 accumulates various kinds of information (hereinafter, referred to as player information) for each piece of player identification information (hereinafter, referred to as player ID) used to identify a player who plays a game. Furthermore, the server 100 updates the accumulated information on the basis of an operation input from each of the player terminals 1.

The communication base stations 200*a* are connected to the communication network 200 and send information to and receive information from the player terminals 1 wirelessly. The communication network 200 is configured of a mobile-phone network, the Internet, a local area network (LAN), a dedicated line, or the like, to realize a wireless or wired communication connection between the player terminals 1 and the server 100.

In the information processing system S of this embodiment, each player terminal 1 and the server 100 function as game devices G. The player terminal 1 and the server 100 respectively play roles for controlling the proceeding of a game, whereby it is possible to proceed with the game through cooperation between the player terminal 1 and the server 100.

[Hardware Configuration of Player Terminal 1 and Server 100]

Figure 2A:
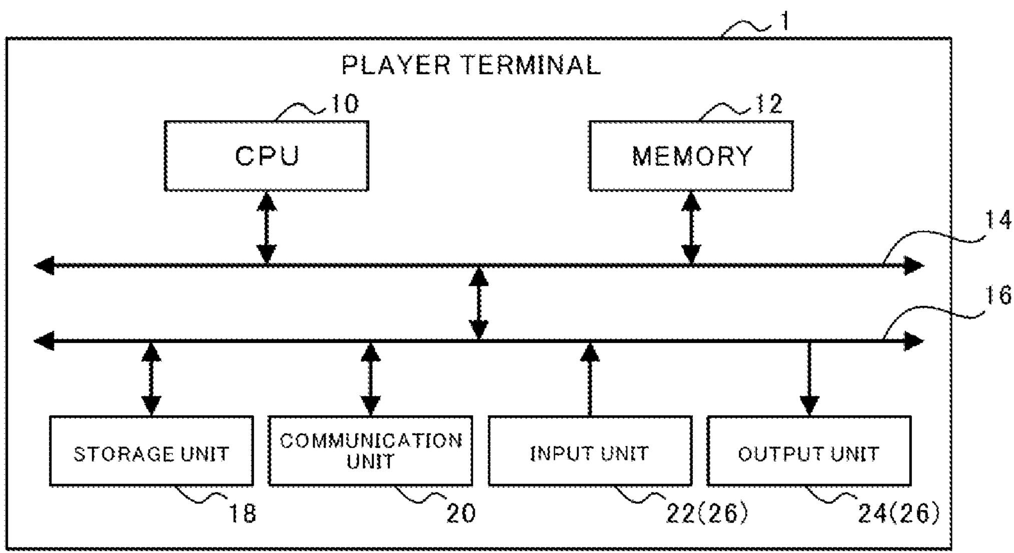
FIG. 2A is a diagram for explaining the hardware configuration of a player terminal.
Figure 2B:
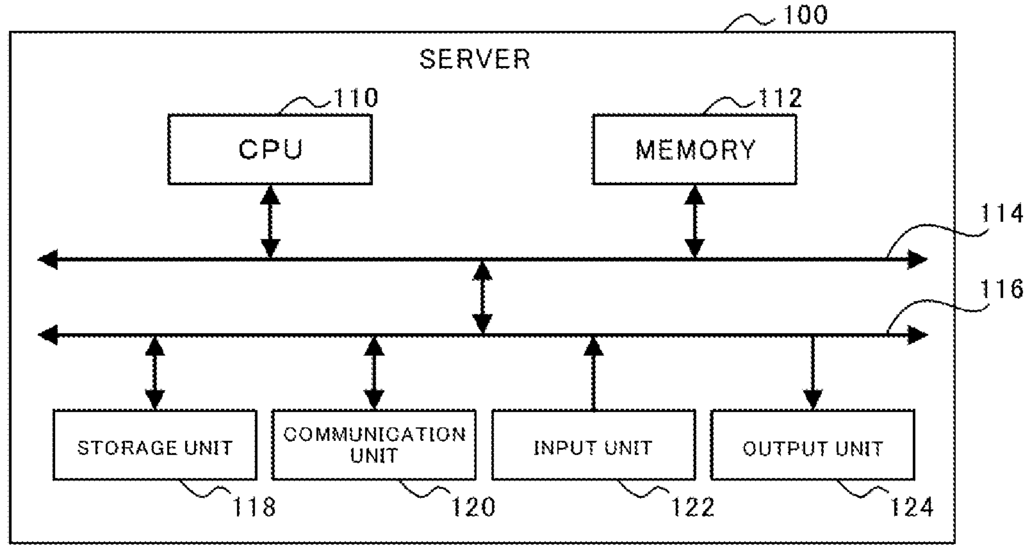
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include one or a plurality of central processing units (CPUs) 10, a memory 12, a bus 14, an input/output interface 16, a storage unit 18, a communication unit 20, an input unit 22, and an output unit 24.

Furthermore, as shown in FIG. 2B, the server 100 is configured to include one or a plurality of CPUs 110, a memory 112, a bus 114, an input/output interface 116, a storage unit 118, a communication unit 120, an input unit 122, and an output unit 124.

Note that the configurations and the functions of the CPU (s) 110, the memory 112, the bus 114, the input/output interface 116, the storage unit 118, the communication unit 120, the input unit 122, and the output unit 124 of the server 100 are substantially the same as those of the CPU(s) 10, the memory 12, the bus 14, the input/output interface 16, the storage unit 18, the communication unit 20, the input unit 22, and the output unit 24 of the player terminal 1, respectively. Therefore, the hardware configuration of the player terminal 1 will be described below, and a description of the hardware configuration of the server 100 will be omitted.

The CPU (s) 10 runs a program stored in the memory 12 to control the proceeding of the game. The memory 12 is configured of a read only memory (ROM) or a random access memory (RAM) and stores programs and various kinds of data needed for controlling the proceeding of the game. The memory 12 is connected to the CPU (s) 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU (s) 10.

The communication unit 20 is communicatively connected to the communication base station 200*a* wirelessly, and sends information to and receives information from the server 100 via the communication network 200, such as various kinds of data and programs. At the player terminal 1, the programs etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 may include a wide range of devices that enable the player to input his or her intents in distinguishable manners.

The output unit 24 is configured to include a display device and a speaker. Note that the output unit 24 may be a device connected (externally attached) to the player terminal 1. In this embodiment, the player terminal 1 includes a touchscreen 26 that functions as the input unit 22 and the output unit 24. The touchscreen 26 also functions as a display unit that displays images or videos.

[Game Content]

Before starting a game, a player downloads a special application from the server 100 into the player terminal 1 in advance and registers a player ID in the server 100. When the application is activated, the player terminal 1 receives information, such as play history information, stored in the server 100 and displays a game screen on the touchscreen 26. In this embodiment, a rhythm game can be played using a plurality of characters (display objects) that have been obtained by the player. Here, during a rhythm game, a music video is displayed along with a song that is played back. The music video is a game screen generated at either the server 100 or the player terminal 1. The music video contains a background image suited for a worldview and a depiction of the song and a character (s) that moves according to the worldview and the depiction of the song. That is, music video data contains background image data suited for the worldview and the depiction of the song, motion data for expressing motions of the character (s), and other data.

Figures 3A, 3B:
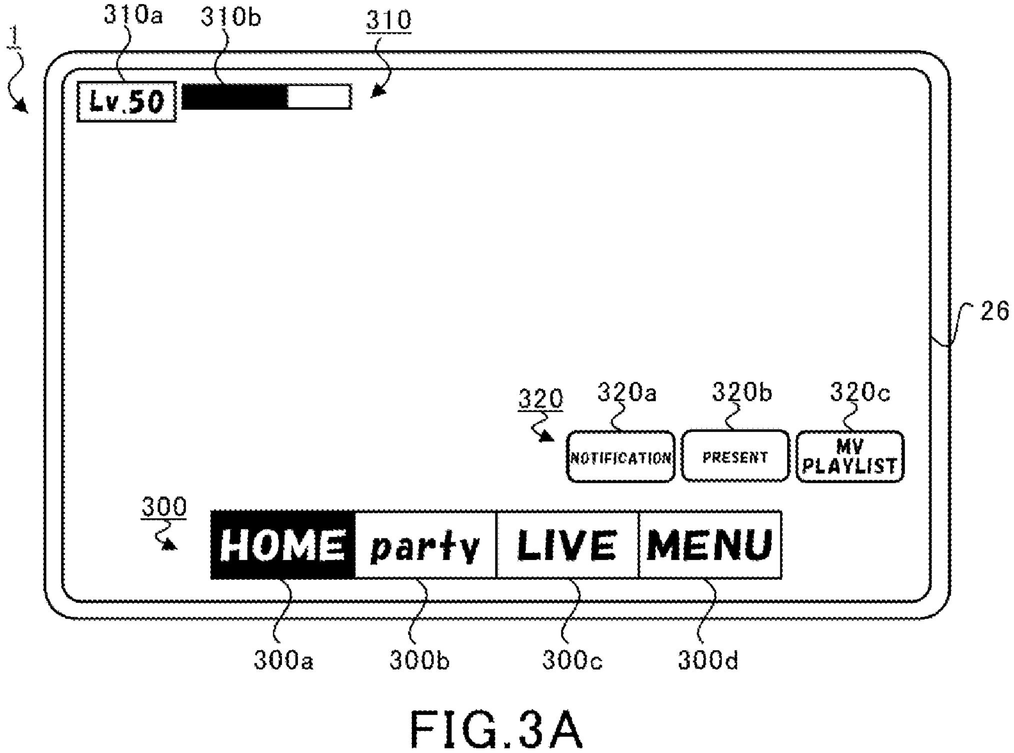
FIG. 3A is a view for explaining an example of a home screen.
FIG. 3B is a view for explaining an example of a live screen.

FIG. 3A is a view for explaining an example of a home screen. FIG. 3B is a view for explaining an example of a live screen. At the player terminal 1, when the application is activated, the home screen, which is shown in FIG. 3A, is displayed on the touchscreen 26.

In the home screen, a menu bar 300 is displayed in a lower section of the touchscreen 26, for example, as shown in FIG. 3A. In the menu bar 300, a plurality of operation sections that can be operated (tapped) by the player are provided. In the menu bar 300, a home-screen selection operation section 300*a*, in which “home” is written, a party-screen selection operation section 300*b*, in which “party” is written, a live-screen selection operation section 300*c*, in which “live” is written, and a menu-screen selection operation section 300*d*, in which “menu” is written, are provided.

When the home-screen selection operation section 300*a* is tapped, the home screen, which is shown in FIG. 3A, is displayed on the touchscreen 26. Furthermore, when the party-screen selection operation section 300*b* is tapped, a party screen (not shown) is displayed on the touchscreen 26. Furthermore, when the live-screen selection operation section 300*c* is tapped, the live screen, which is shown in FIG. 3B, is displayed on the touchscreen 26. Furthermore, when the menu-screen selection operation section 300*d* is tapped, a menu screen (not shown) is displayed on the touchscreen

26. Note that, although a detailed description will be omitted, game settings and various kinds of information can be confirmed in the menu screen. In order to be able to identify the screen that is currently displayed on the touchscreen 26, the operation section corresponding to that screen is displayed in a highlighted manner in the menu bar 300.

The home screen, which is shown in FIG. 3A, corresponds to an initial screen, and a header display area 310 is provided at an upper section thereof. In the header display area 310, a level information 310*a* indicating a player level associated with the player ID and a stamina display bar 310*b* indicating the stamina of the player associated with the player ID are displayed.

Note that the stamina is a parameter needed to play rhythm games. In this embodiment, a plurality of kinds of rhythm games are provided, and a stamina consumption value needed for playing is set for each of the rhythm games. A stamina consumption amount needed for playing changes depending on the type or the difficulty level of each rhythm game. In the case where a rhythm game for which a stamina consumption value needed for playing has been set is played, the player consumes the corresponding stamina to play the rhythm game. Thus, if the stamina is insufficient, the player cannot play the rhythm game.

Although a detailed description will be omitted, when the player clears a rhythm game, the player can obtain a predetermined number of points as player experience points. Then, every time the player experience points reach a fixed value, the player level is raised.

Furthermore, an upper limit of the stamina is set for the player level, and the upper limit of the stamina is increased as the player level is raised. The stamina is restored by a predetermined number of points (for example, 1 point) every fixed period of time (for example, five minutes) within the range defined by the upper limit. The current remaining amount of the stamina with respect to the upper limit of the stamina is displayed at the stamina display bar 310*b* so as to be visually ascertainable.

A home menu 320 is displayed between the menu bar 300 and the header display area 310 in the home screen. In the home menu 320, a notification-screen selection operation section 320*a*, in which “notification” is written, a present-screen selection operation section 320*b*, in which “present” is written, and an MV-playlist-screen selection operation section 320*c*, in which “MV playlist” is written, are provided.

Figure 4:
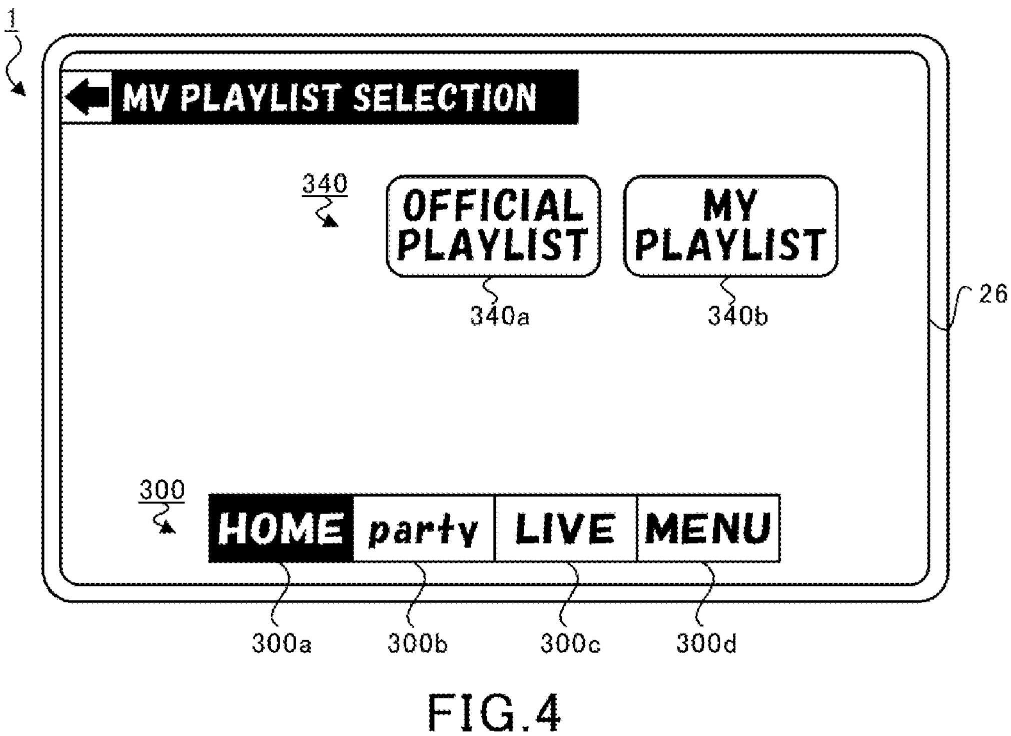
FIG. 4 is a view for explaining an example of an MV-playlist selection screen.

When the notification-screen selection operation section 320*a* is tapped, a notification screen (not shown) for displaying update information, maintenance information, etc. is displayed on the touchscreen 26. Furthermore, when the present-screen selection operation section 320*b* is tapped, a present screen (not shown) for displaying an item distributed by a game administrator, for example, is displayed on the touchscreen 26. Furthermore, when the MV-playlist-screen selection operation section 320*c* is tapped, an MV playlist screen shown in FIG. 4 is displayed on the touchscreen 26.

Although a detailed description will be omitted, the home menu 320 is set so as to be customizable by the player. Specifically, home-screen button setting is performed in the menu screen (not shown), thereby making it possible to customize the individual selection operation sections displayed in the home menu 320.

When the live-screen selection operation section 300*c*, which is shown in FIG. 3A, is tapped, the live screen, which is shown in FIG. 3B, is displayed on the touchscreen 26. The live screen is a screen in which the player selects the game classification of a rhythm game. Here, a plurality of game classifications are provided, in which different songs are played back during the corresponding rhythm game. Note that, although a detailed description will be omitted, a plurality of game classifications may be provided, which have different difficulty levels with respect to the same song.

In the live screen, a song information tab 330*a*, title display tabs 330*b*, and a determination tab 332 are displayed. In the song information tab 330*a*, the title of a song that is being temporarily registered, play history information of a game classification that is being temporarily registered, etc., are displayed. Furthermore, in this embodiment, instead of the title of a song that is being temporarily registered, “random” is displayed in the song information tab 330*a*, in some cases, as shown in FIG. 3B.

The plurality of title display tabs 330*b* are displayed above and below the song information tab 330*a*. Only the title of a song is displayed in each of the title display tabs 330*b*. When a selection operation (flick operation in the vertical direction) is performed in a display area for the song information tab 330*a* and the title display tabs 330*b*, titles are movably displayed in the operation direction. Accordingly, the song that is being temporarily registered is changed, and the display content in the song information tab 330*a* is also changed. Furthermore, when a selection operation for tapping either one of the title display tabs 330*b* is performed, the song that is being temporarily registered is changed to the song corresponding to the tapped title display tab 330*b*.

Furthermore, a music-video playback tab 334 is displayed in the song information tab 330*a*. After the music-video playback tab 334 is tapped in the song information tab 330*a* in which “random” is displayed, when the determination tab 332 is tapped, a random-playback setting screen is displayed on the touchscreen 26.

Furthermore, a folding-menu operation section 336 is displayed in the live screen. The folding-menu operation section 336 is displayed so as to be overlaid on some of the title display tabs 330*b*. FIG. 3B shows a state in which the folding-menu operation section 336 is unfolded. When the folding-menu operation section 336 is tapped from the unfolded state shown in FIG. 3B, the folding-menu operation section 336 is folded, and the title display tabs 330*b* displayed by being hidden under the folding-menu operation section 336 become visible.

In the folding-menu operation section 336, an MV-playlist-screen selection operation section 336*a* is displayed. When the MV-playlist-screen selection operation section 336*a* is tapped, an MV-playlist selection screen shown in FIG. 4 is displayed on the touchscreen 26.

FIG. 4 is a view for explaining an example of the MV-playlist selection screen. As shown in FIG. 4, a playlist selection operation section 340 is displayed in the MV-playlist selection screen. The playlist selection operation section 340 includes an official-playlist selection operation section 340*a* and a my-playlist selection operation section 340*b*. When the official-playlist selection operation section 340*a* is tapped, an official-playlist selection screen is displayed on the touchscreen 26.

Figure 5:
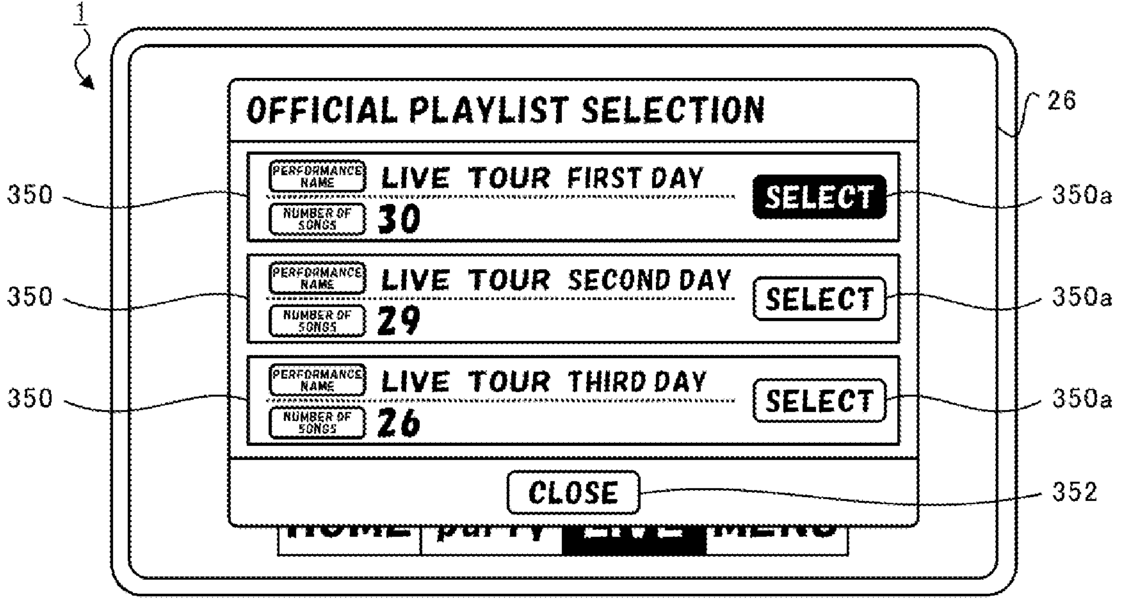
FIG. 5 is a view for explaining an example of an official-playlist selection screen.

FIG. 5 is a view for explaining an example of the official-playlist selection screen. As shown in FIG. 5, a plurality of official-playlist display tabs 350 are displayed in the official-playlist selection screen. In each of the official-playlist display tabs 350, a playlist selection operation section 350*a* that can be selected by the player is displayed. Among a plurality of playlist selection operation sections 350*a*, one playlist selection operation section 350*a* is set so as to be selectable by the player. When the playlist selection operation section 350*a* is tapped, an official-MV-playlist screen shown in FIG. 6 is displayed.

Furthermore, in the official-playlist selection screen, a close selection operation section 352, in which "close" is written, is displayed. When the close selection operation section 352 is tapped, the MV-playlist selection screen, which is shown in FIG. 4, is displayed on the touchscreen 26.

Figure 6:
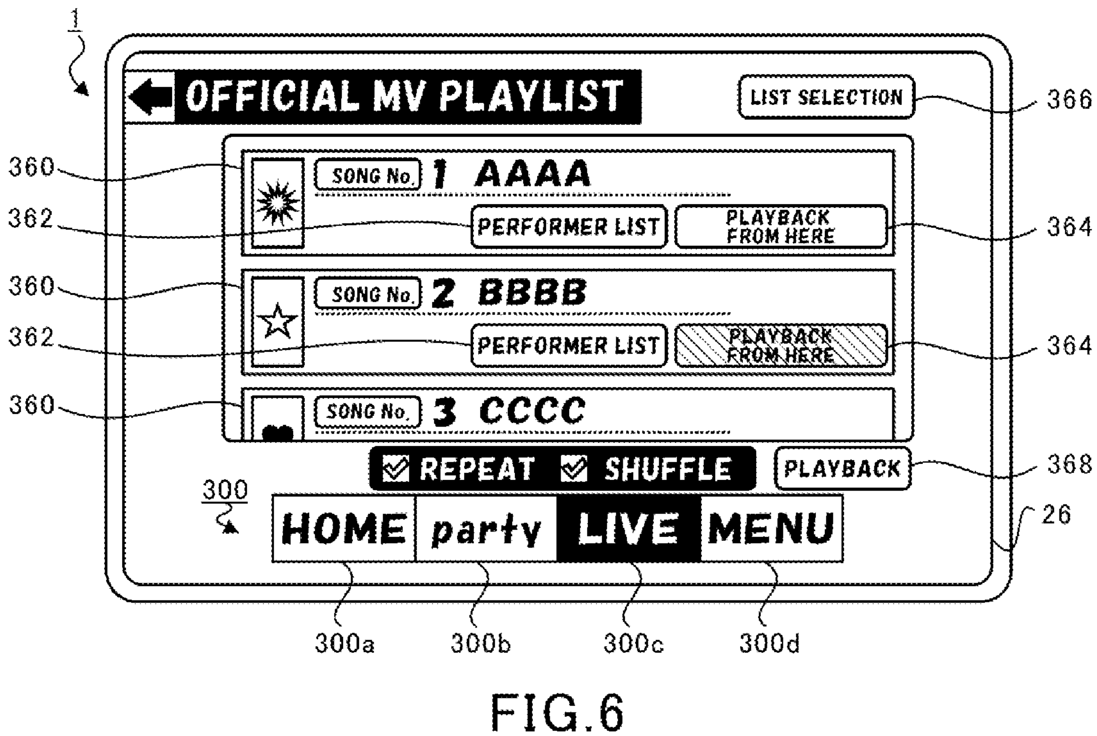
FIG. 6 is a view for explaining an example of an official-MV-playlist screen.

FIG. 6 is a view for explaining an example of the official-MV-playlist screen. An official MV playlist is a function that is created by following a setlist of game songs used at an actually held live event and in which music videos specially created for the individual songs are continuously played back by following the setlist and are enjoyed by the player. As shown in FIG. 6, a list of a plurality of music-video display tabs 360, with which songs in the official MV playlist selected by the player are arranged in order of the songs, is displayed in the official-MV-playlist screen.

In each of the music-video display tabs 360, song number information, song name information, and song image information are displayed. Furthermore, in each of the music-video display tabs 360, a performer-list selection operation section 362 and a playback-start-position selection operation section 364 are displayed. When the performer-list selection operation section 362 is tapped, information related to a character (s) appearing in the music video for the song is displayed in a performer-list screen (not shown).

Furthermore, when the playback-start-position selection operation section 364 is tapped, the music videos are continuously played back sequentially from the tapped song in the official MV playlist. Note that, in the song for which the music video has not been released in the rhythm game, the playback-start-position selection operation section 364 is displayed so as not to be operable by the player, for example, as indicated by hatching in the FIG. 6. Furthermore, in the song for which the music video has already been released in the rhythm game, the playback-start-position selection operation section 364 is displayed so as to be operable by the player, for example, as indicated by non-hatching in FIG. 6.

Note that, in the case where a song for which the music video has not been released in the rhythm game is included in the official MV playlist, the song is excluded from the continuous playback of the official MV playlist and is skipped.

Furthermore, a list selection operation section 366 is displayed in the official-MV-playlist screen. When the list selection operation section 366 is tapped, the official-playlist selection screen, which is shown in FIG. 5, is displayed on the touchscreen 26.

Furthermore, a playback selection operation section 368 is displayed in the official-MV-playlist screen. When the playback selection operation section 368 is tapped, the music videos are continuously played back following the order of the official MV playlist displayed in FIG. 6. When the touchscreen 26 is tapped during the continuous playback of the music videos, the music video is paused, and a music-video pause screen is displayed on the touchscreen 26.

Figure 7:
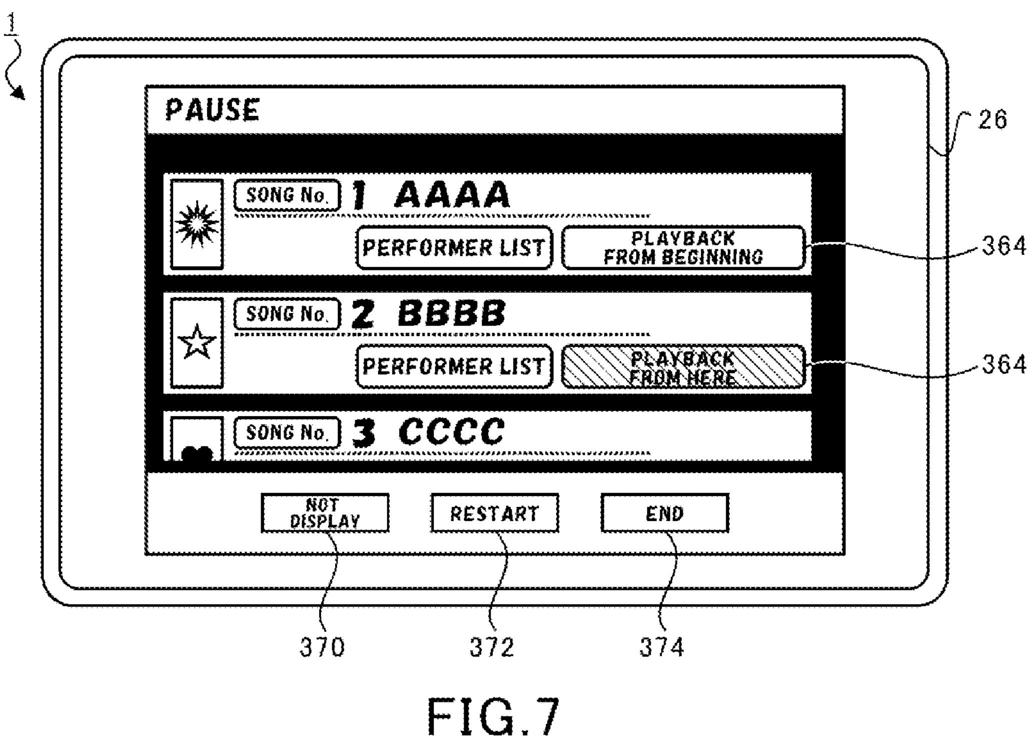
FIG. 7 is a view for explaining an example of a music-video pause screen.

FIG. 7 is a view for explaining an example of the music-video pause screen. As shown in FIG. 7, a non-display selection operation section 370, a restart selection operation section 372, and an end selection operation section 374 are displayed in the music-video pause screen. When the non-display selection operation section 370 is tapped, the music-video pause screen, which is shown in FIG. 7, is not displayed. When the restart selection operation section 372 is tapped, the paused music video is restarted. When the end selection operation section 374 is tapped, the continuous playback of the music videos is ended, and the official-MV-playlist screen, which is shown in FIG. 6, is displayed on the touchscreen 26.

Figure 8:
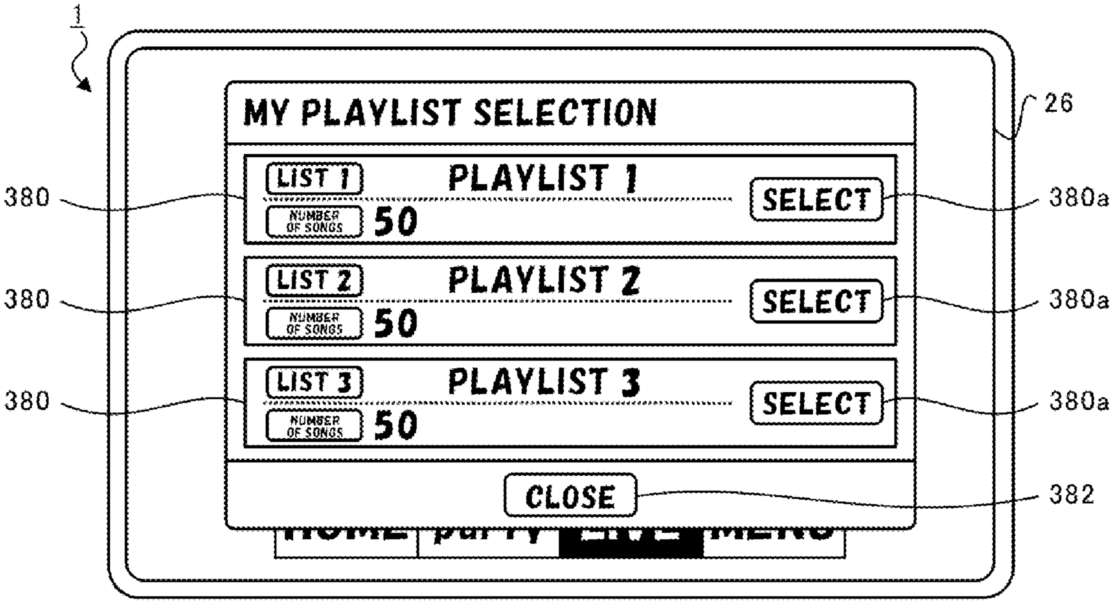
FIG. 8 is a view for explaining an example of a my-playlist selection screen.

FIG. 8 is a view for explaining an example of a my-playlist selection screen. When the my-playlist selection operation section 340*b*, which is shown in FIG. 4, is tapped, the my-playlist selection screen, which is shown in FIG. 8, is displayed on the touchscreen 26. As shown in FIG. 8, a plurality of my-playlist display tabs 380 are displayed in the my-playlist selection screen. In each of the my-playlist display tabs 380, list number information, maximum-number-of-songs information, and playlist name information are displayed. In this embodiment, a value of 50 is set as the maximum-number-of-songs information. However, the maximum number of songs is not limited thereto, the maximum number of songs just needs to be plural, and the value of the maximum-number-of-songs information may be any value that is equal to or larger than 2.

Furthermore, in each of the my-playlist display tabs 380, a playlist selection operation section 380*a* that can be selected by the player is displayed. Among a plurality of playlist selection operation sections 380*a*, one playlist selection operation section 380*a* is set so as to be selectable by the player. When the playlist selection operation section 380*a* is tapped, a my-MV-playlist screen shown in FIG. 9 is displayed.

Furthermore, in the my-playlist selection screen, a close selection operation section 382, in which "close" is written, is displayed. When the close selection operation section 382 is tapped, the MV-playlist selection screen, which is shown in FIG. 4, is displayed on the touchscreen 26.

Figure 9:
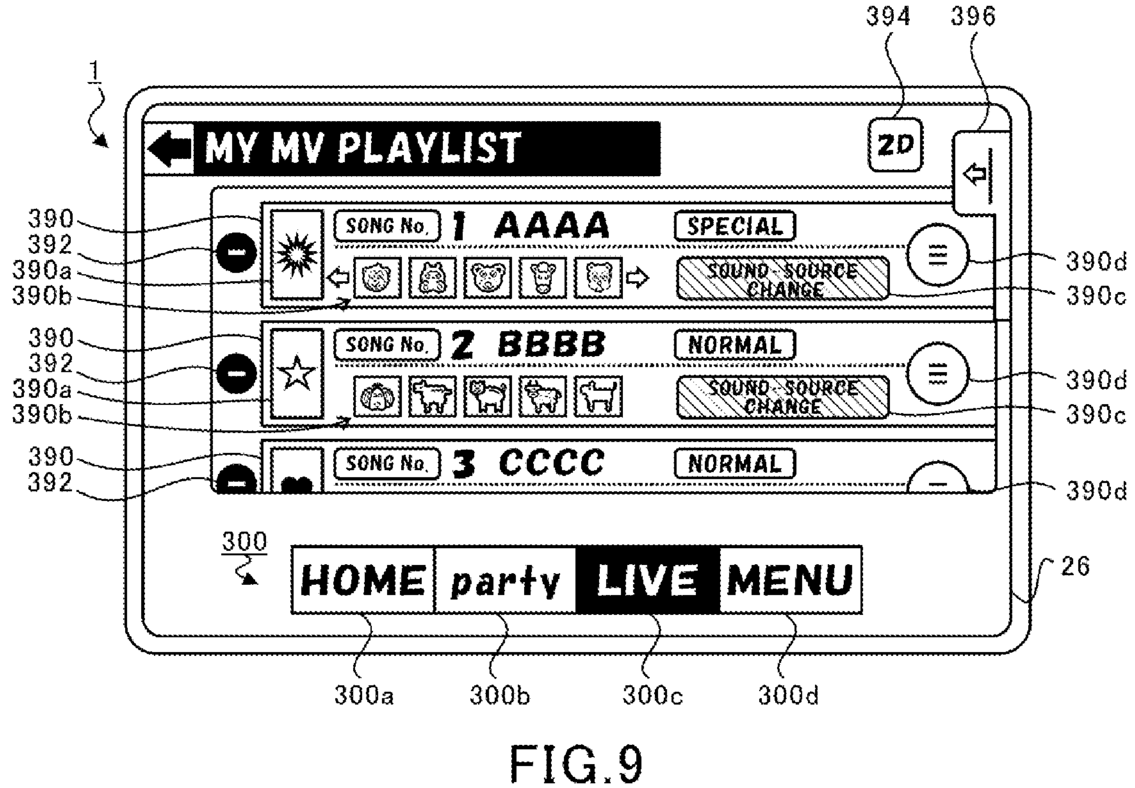
FIG. 9 is a view for explaining an example of a my-MV-playlist screen.

FIG. 9 is a view for explaining an example of the my-MV-playlist screen. A my MV playlist is a function that can be generated by freely customizing a player's own set list, unlike the official MV playlist. In the my MV playlist, the player can set and register player's favorite songs in any order, from among songs used in rhythm games in the game. With the my MV playlist, the player can enjoy the music videos for the songs through continuous playback following the order (set list) set by the player. The number of songs that can be registered in a my MV playlist is determined by the maximum-number-of-songs information, which is shown in FIG. 8. In this embodiment, since a value of 50 is set as the maximum-number-of-songs information, the maximum number of songs that can be set and registered in each my MV playlist by the player is 50. As shown in FIG. 9, a list of a plurality of music video display tabs 390, with which songs in the my MV playlist selected by the player are arranged in order of the songs, is displayed in the my-MV-playlist screen.

In each of the music video display tabs 390, song number information (song order information), song name information, and party organization form information are displayed. The song number information indicates the order of playback of the song in the my MV playlist. The party organization form information includes information related to a normal form, in which "normal" is written, and information related to a special form, in which "special" is written. In the normal form, the maximum number of characters that can be registered in one party is less than that in the special form. For example, whereas the maximum number of characters that can be registered in one party in the normal form is "5", the maximum number of characters that can be registered in one party in the special form is "15".

At the left side of each of the music video display tabs 390, a delete selection operation section 392 is displayed.

One delete selection operation section 392 is made to correspond to each of the music video display tabs 390, and, when the delete selection operation section 392 is tapped, the music video display tab 390 corresponding to the tapped delete selection operation section 392 is deleted. Specifically, the song ID and the party organization information that are associated with the tapped song order information, to be described in detail later, are deleted from the my MV playlist. Accordingly, an unwanted song in the my MV playlist can be deleted by the player.

Furthermore, a 2D-3D switch operation section 394 is displayed above the my MV playlist. With the 2D-3D switch operation section 394, the display format of characters included in the music videos is switched between a 2D format and a 3D format.

Furthermore, in each of the music video display tabs 390, a song selection operation section 390*a*, a character selection operation section 390*b*, a sound-source selection operation section 390*c*, and an order-change selection operation section 390*d* are displayed.

When the song selection operation section 390*a* is tapped, a rhythm-game song list (not shown) is displayed on the touchscreen 26. The player selects one song from the rhythm-game song list, whereby the song is set in the current my MV playlist, and a song tapped by the player can be changed. Specifically, when one song is selected from the rhythm-game song list (not shown) by the player, the song is set in the current my MV playlist, and identification information (hereinafter, referred to as song ID) of a song tapped by the player is updated to the selected song ID.

Figure 10:
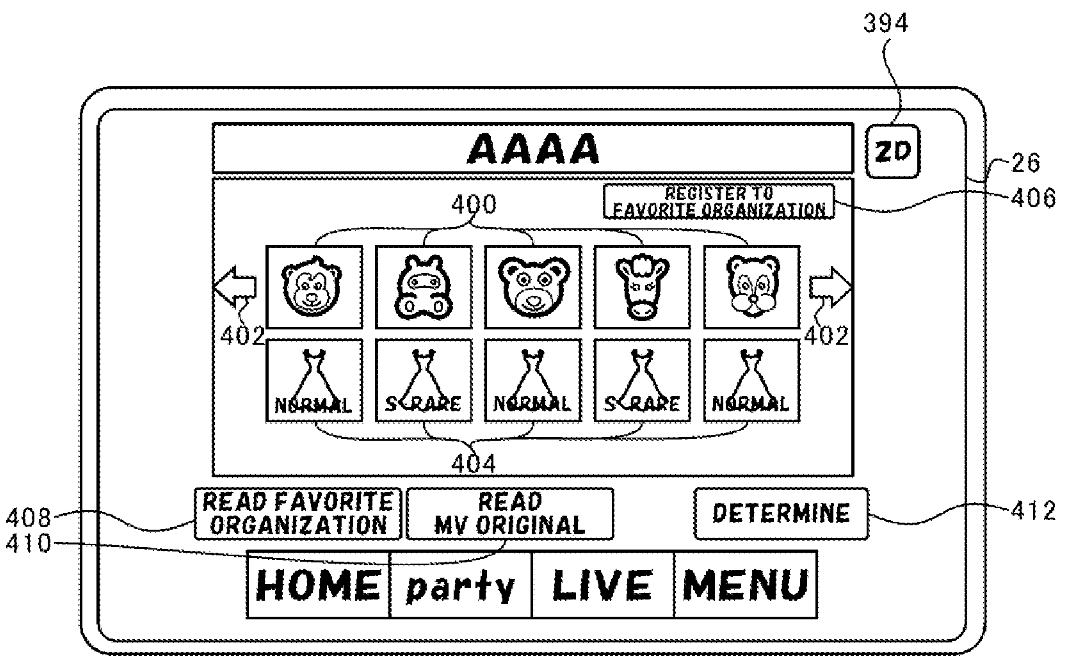
FIG. 10 is a view for explaining an example of a party organization screen.

When the character selection operation section 390*b* is tapped, a party organization screen shown in FIG. 10 is displayed on the touchscreen 26. Details of a party organization in the special form will be described below. Since a party organization in the normal form is the same as a party organization in the special form, a description thereof will be omitted.

FIG. 10 is a view for explaining an example of the party organization screen. The party organization screen is a screen in which the player sets characters to be included in the music video. As shown in FIG. 10, five identification images 400 showing characters organized in the party are displayed in the party organization screen. Since up to 15 characters can be organized in the party in the special form, switching operation sections 402 are displayed at right and left sides of the five identification images 400. By tapping either one of the switching operation sections 402, the identification images 400, which show five characters in the party organization in the special form, can be switched and displayed. In the party organization screen, when any of the identification images 400 is tapped, a character selection screen shown in FIG. 11 is displayed on the touchscreen 26.

Figure 11:
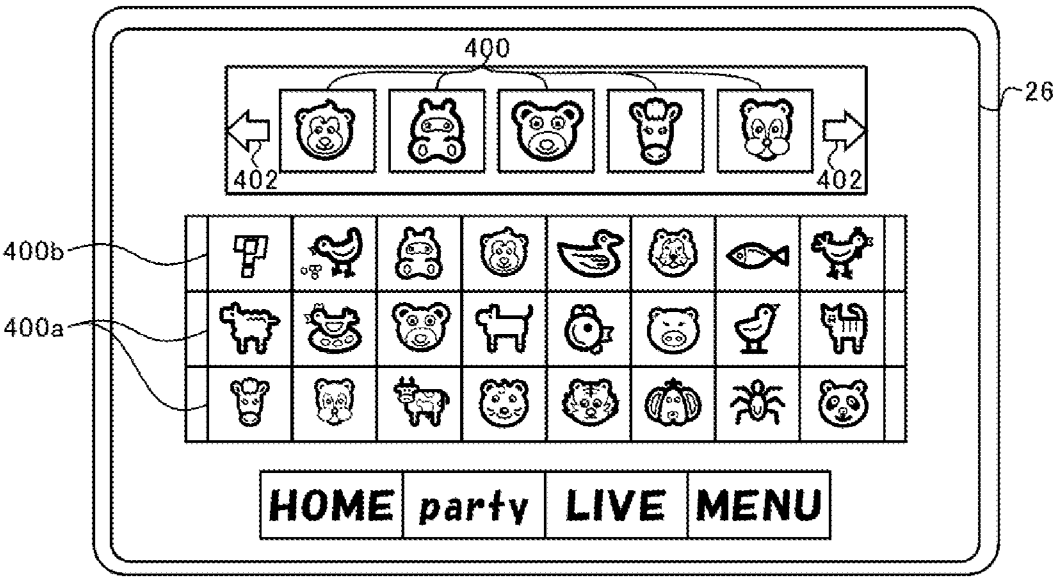
FIG. 11 is a view for explaining an example of a character selection screen.

FIG. 11 is a view for explaining an example of the character selection screen. As shown in FIG. 11, a list of characters that have ever been possessed by the player is displayed in the character selection screen. Here, player information includes identification information of characters (hereinafter, referred to as character IDs). The character IDs included in the player information include the character IDs of characters that have been possessed by the player at least once in the past.

When the player taps an identification image 400*a* of any character displayed in the character list, the character ID of the identification image 400 tapped in the party organization screen, which is shown in FIG. 10, can be changed (updated) to the character ID of the identification image 400*a* tapped in the character selection screen, which is shown in FIG. 11.

Furthermore, a random selection operation section 400*b* is displayed at the top left of the character list shown in FIG. 11. When the random selection operation section 400*b* is tapped, one character ID is selected at random from among the character IDs included in the player information. Then, the character ID of the identification image 400 tapped in the party organization screen, which is shown in FIG. 10, is changed (updated) to the character ID selected at random.

Figure 12A:
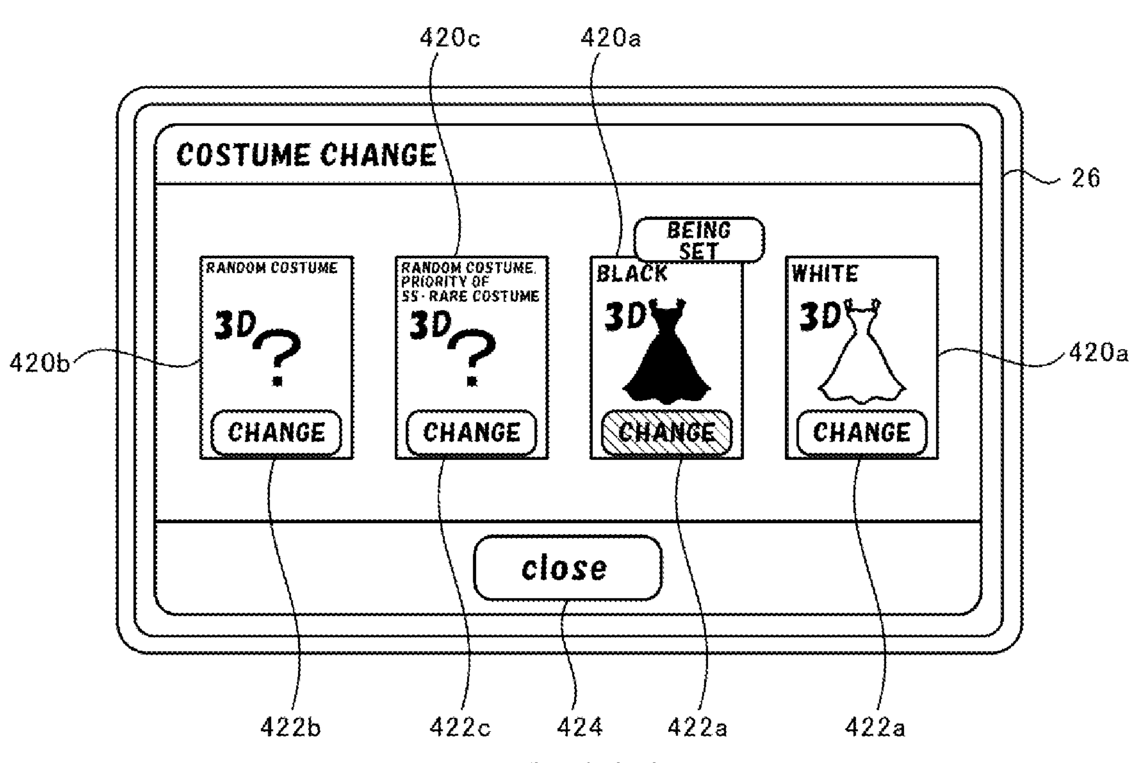
FIG. 12A is a view for explaining an example of a 3D costume selection screen.
Figure 12B:
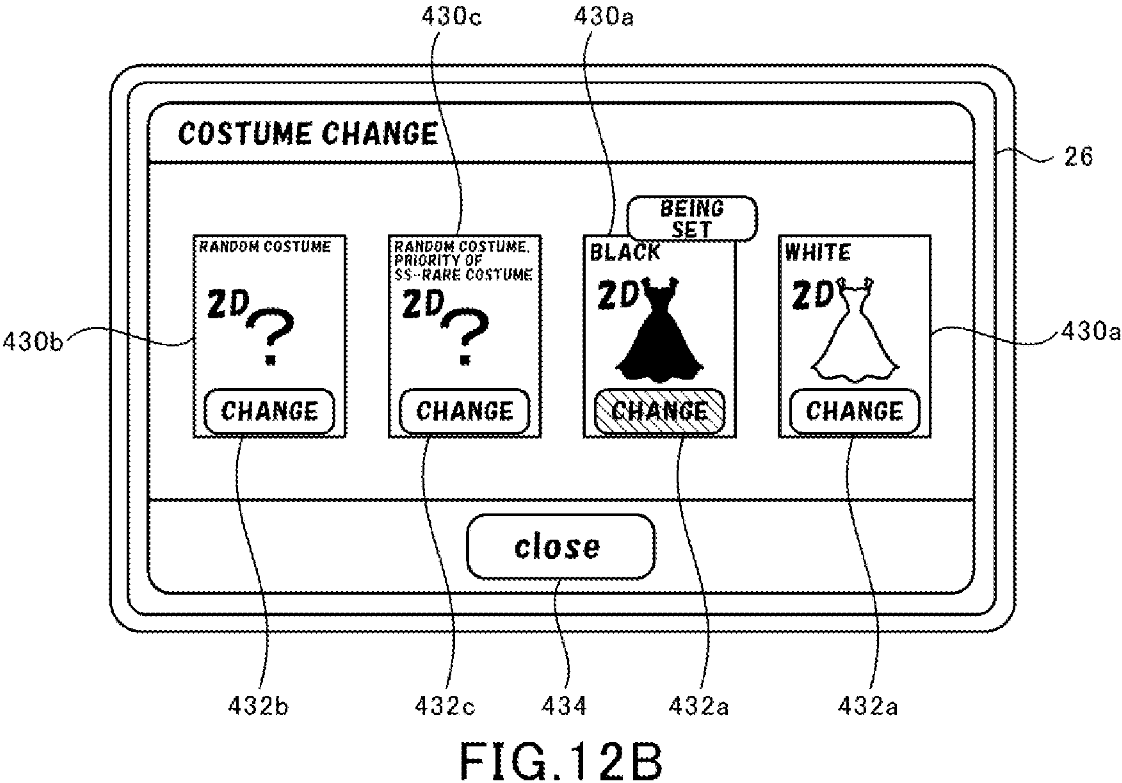
FIG. 12B is a view for explaining an example of a 2D costume selection screen.

Returning to FIG. 10, in the party organization screen, five identification images 404 showing costumes (display objects) that are made to correspond to the individual characters are displayed below the identification images 400 of the characters. The costumes are items that can be worn by the individual characters. In the party organization screen, when any of the identification images 404 is tapped, a costume selection screen shown in FIG. 12A and FIG. 12B is displayed on the touchscreen 26. The costume selection screen is a screen in which the player sets costumes for the characters included in the music video.

FIG. 12A is a view for explaining an example of a 3D costume selection screen. FIG. 12B is a view for explaining an example of a 2D costume selection screen. In accordance with the character display format switched by the 2D-3D switch operation section 394, which is shown in FIG. 9 or FIG. 10, one of the costume selection screens shown in FIG. 12A and FIG. 12B is displayed on the touchscreen 26.

As shown in FIG. 12A, in the 3D costume selection screen, one or a plurality of 3D costume information tabs 420*a*, a 3D random costume information tab 420*b*, a 3D random costume priority information tab 420*c*, and a close tab 424 are displayed. In the 3D costume information tab (s) 420*a*, an image and a name of a costume to be displayed in the 3D music video are displayed. The 3D random costume information tab 420*b* indicates that a costume to be displayed in the 3D music video will be randomly determined. The 3D random costume priority information tab 420*c* indicates that identification information of a costume (hereinafter, referred to as costume ID) with high rarity (for example, SS rare), among character costumes to be displayed in the 3D music video, will be preferentially determined.

When the player taps a change tab 422*a* in the 3D costume information tab (s) 420*a*, the costume ID of the identification image 404 tapped in the party organization screen, which is shown in FIG. 10, can be changed to the costume ID tapped in the costume selection screen shown in FIG. 12A. Here, the costume IDs for characters that have ever been possessed by the player are included in the player information.

Furthermore, when a change tab 422*b* in the 3D random costume information tab 420*b* or a change tab 422*c* in the 3D random costume priority information tab 420*c* is tapped, one costume ID is selected at random from among the costume IDs included in the player information. Then, the costume ID of the identification image 404 tapped in the party organization screen, which is shown in FIG. 10, is changed to the costume ID selected at random. When the close tab 424 is tapped in the 3D costume selection screen, the party organization screen, which is shown in FIG. 10, is displayed on the touchscreen 26.

Furthermore, as shown in FIG. 12B, in the 2D costume selection screen, one or a plurality of 2D costume information tabs 430*a*, a 2D random costume information tab 430*b*, a 2D random costume priority information tab 430*c*, and a close tab 434 are displayed. In the 2D costume information tab (s) 430*a*, an image and a name of a costume to be displayed in the 2D music video are displayed. The 2D random costume information tab 430*b* indicates that a costume to be displayed in the 2D music video will be randomly determined. The 2D random costume priority information tab 430c indicates that a costume ID with high rarity (for example, SS rare), among character costumes to be displayed in the 2D music video, will be preferentially determined.

When the player taps a change tab 432a in the 2D costume information tab(s) 430a, the costume ID of the identification image 404 tapped in the party organization screen, which is shown in FIG. 10, can be changed to the costume ID tapped in the costume selection screen shown in FIG. 12B.

Furthermore, when a change tab 432b in the 2D random costume information tab 430b or a change tab 432c in the 2D random costume priority information tab 430c is tapped, one costume ID is selected at random from among the costume IDs included in the player information. Then, the costume ID of the identification image 404 tapped in the party organization screen, which is shown in FIG. 10, is changed to the costume ID selected at random. When the close tab 424 is tapped in the 2D costume selection screen, the party organization screen, which is shown in FIG. 10, is displayed on the touchscreen 26.

Returning to FIG. 10, in the party organization screen, a favorite registration selection operation section 406 is displayed above the identification images 400 of the individual characters. When the favorite registration selection operation section 406 is tapped in the party organization screen, a favorite-organization saving screen shown in FIG. 13A is displayed on the touchscreen 26.

Figure 13A:
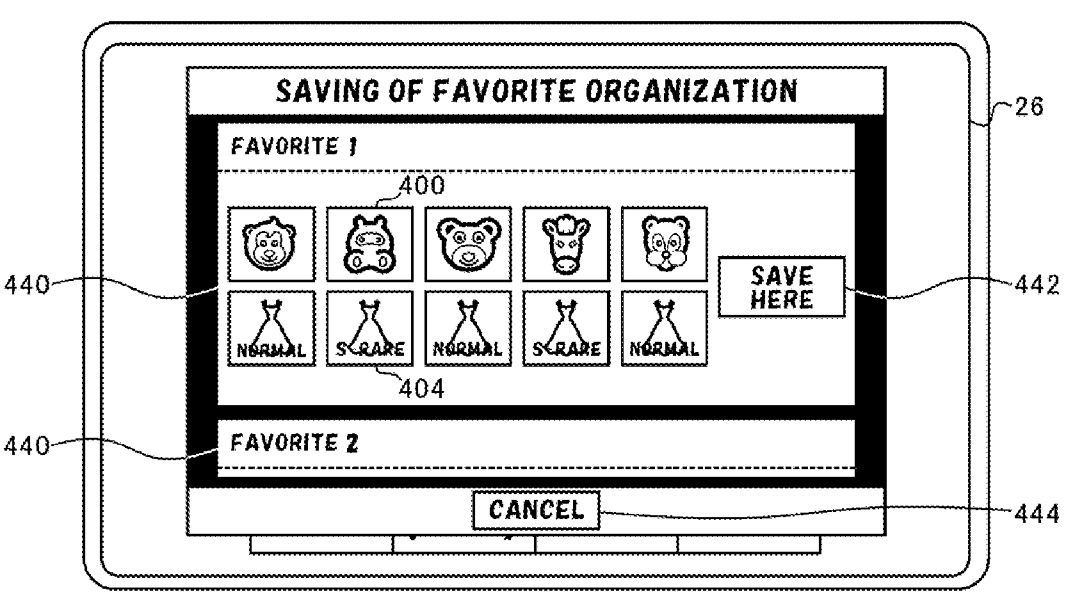
FIG. 13A is a view for explaining an example of a favorite-organization saving screen.
Figure 13B:
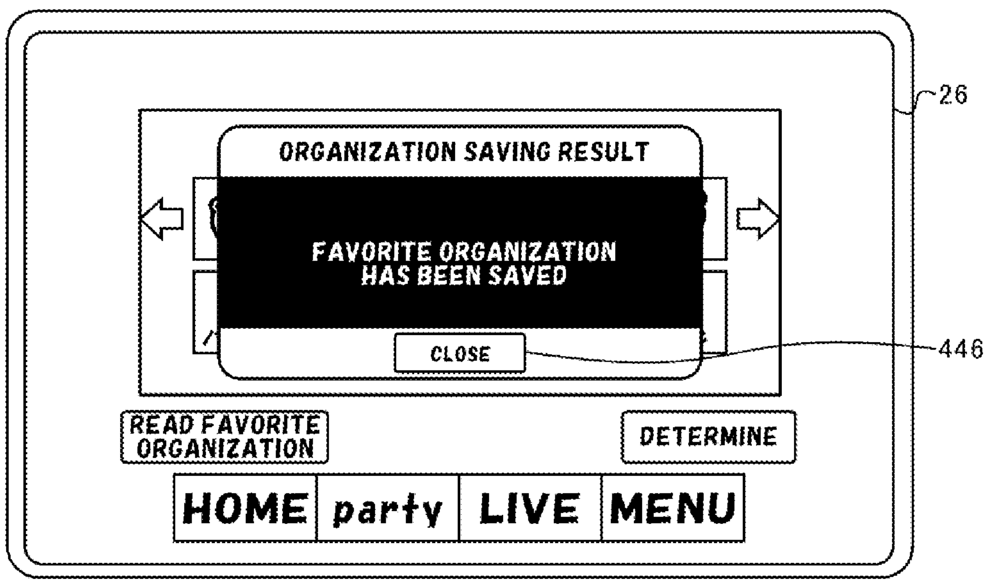
FIG. 13B is a view for explaining an example of a favorite-organization saving result screen.

FIG. 13A is a view for explaining an example of the favorite-organization saving screen. FIG. 13B is a view for explaining an example of a favorite-organization saving result screen. As shown in FIG. 13A, in the favorite-organization saving screen, a plurality of favorite-organization registration tabs 440 are displayed.

In each of the favorite-organization registration tabs 440, the identification images 400 of the characters and the identification images 404 of the costumes in the party organization screen, which is shown in FIG. 10, are displayed. Furthermore, in each of the favorite-organization registration tabs 440, a saving selection operation section 442 and a cancel selection operation section 444 are displayed.

When the saving selection operation section 442 is tapped, favorite-organization saving processing is executed. In the favorite-organization saving processing, information related to the party organization set in the party organization screen, which is shown in FIG. 10, (hereinafter, referred to as party organization information) is stored, as favorite-organization information, in association with the player information. In the favorite-organization information, the character IDs, the costume IDs, organization order information related to the order in the party organization, etc., are included. On the other hand, when the cancel selection operation section 444 is tapped, the favorite-organization saving processing is not executed, the party organization screen, which is shown in FIG. 10, is displayed on the touchscreen 26.

When the favorite-organization saving processing is executed, the favorite-organization saving result screen, which is shown in FIG. 13B, is displayed on the touchscreen 26. In the favorite-organization saving result screen, a confirmation sentence indicating that the favorite organization has been saved and a close selection operation section 446, in which "close" is written, are displayed. When the close selection operation section 446 is tapped, the favorite-organization saving processing is completed, and the party organization screen, which is shown in FIG. 10, is displayed on the touchscreen 26.

Figure 14A:
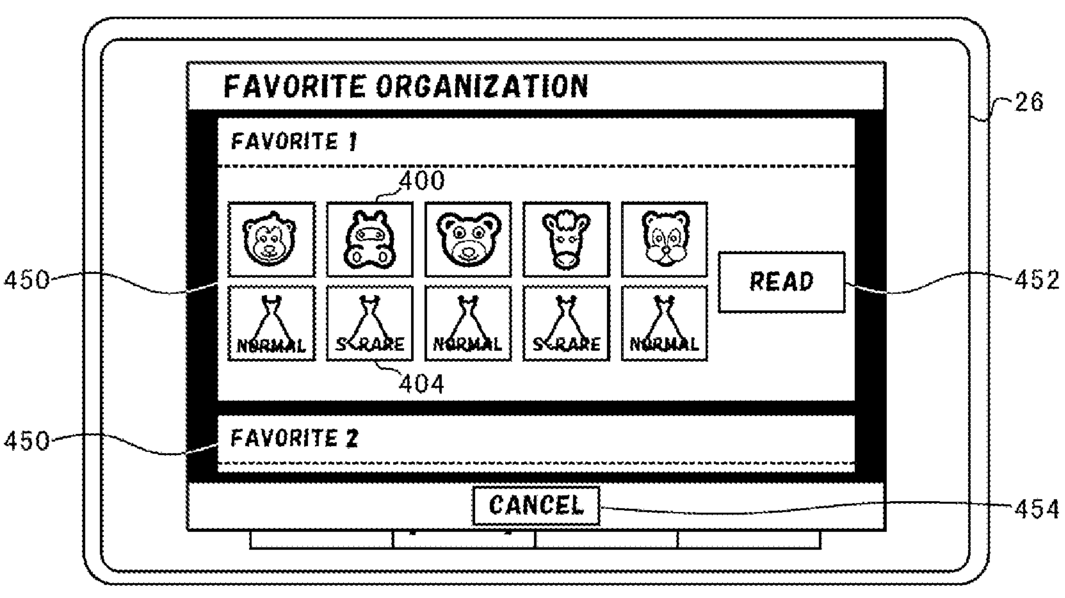
FIG. 14A is a view for explaining an example of a favorite-organization reading screen.
Figure 14B:
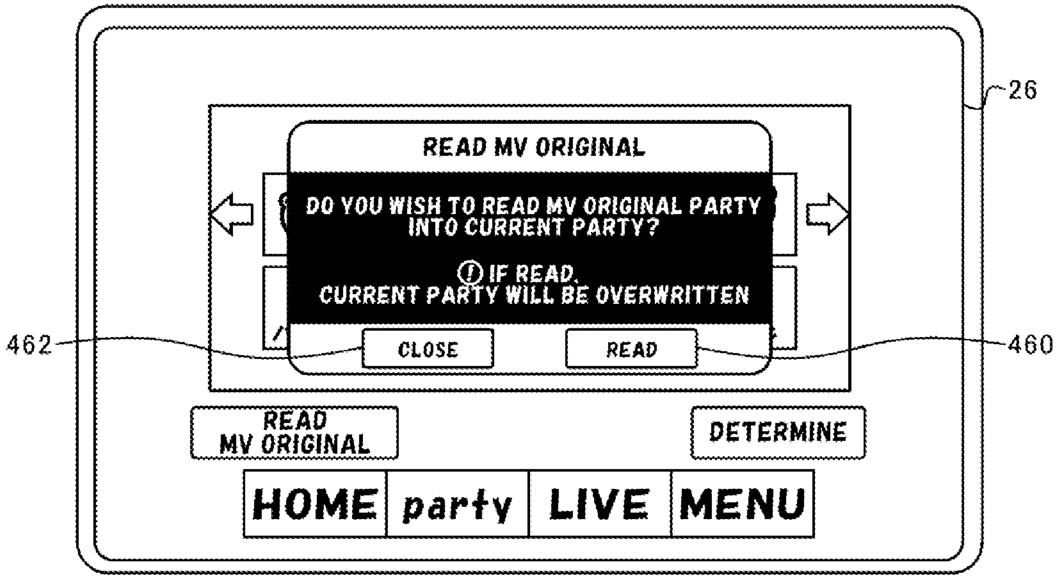
FIG. 14B is a view for explaining an example of an MV-original reading screen.

Returning to FIG. 10, in the party organization screen, a favorite reading selection operation section 408, an MV-original reading selection operation section 410, and a determination selection operation section 412 are displayed below the identification images 404 of the individual costumes. When the favorite reading selection operation section 408 is tapped in the party organization screen, a favorite-organization reading screen shown in FIG. 14A is displayed on the touchscreen 26. Furthermore, when the MV-original reading selection operation section 410 is tapped, an MV-original reading screen shown in FIG. 14B is displayed on the touchscreen 26. Furthermore, when the determination selection operation section 412 is tapped, the currently set party organization in FIG. 10 is determined. At this time, the party organization information (the character IDs, the costume IDs, etc.) is stored (saved) in the my MV playlist in association with the song ID.

FIG. 14A is a view for explaining an example of the favorite-organization reading screen. FIG. 14B is a view for explaining an example of the MV-original reading screen. As shown in FIG. 14A, in the favorite-organization reading screen, a plurality of favorite-organization reading tabs 450 are displayed. The plurality of favorite-organization reading tabs 450 correspond to the plurality of favorite-organization registration tabs 440 shown in FIG. 13A.

In each of the individual favorite-organization reading tabs 450, the identification images 400 of the characters and the identification images 404 of the costumes in the corresponding favorite-organization registration tab 440 shown in FIG. 13A are displayed. Furthermore, in each of the favorite-organization reading tabs 450, a reading selection operation section 452 and a cancel selection operation section 454 are displayed.

When the reading selection operation section 452 is tapped, favorite-organization reading processing is executed. In the favorite-organization reading processing, the favorite-organization information corresponding to the tapped favorite-organization reading tab 450 is read from the player information. On the other hand, when the cancel selection operation section 454 is tapped, the favorite-organization reading processing is not executed, and the party organization screen, which is shown in FIG. 10, is displayed on the touchscreen 26.

When the favorite-organization reading processing is executed, the party organization in the party organization screen, which is shown in FIG. 10, is updated on the basis of the read favorite-organization information.

As shown in FIG. 14B, in the MV-original reading screen, a warning sentence is displayed, which indicates that the currently organized party shown in FIG. 10 will be overwritten when an MV original party is read. Furthermore, in the MV-original reading screen, a reading selection operation section 460 and a close selection operation section 462, in which "close" is written, are displayed.

When the reading selection operation section 460 is tapped, MV original-party-organization reading processing is executed. Music videos are set so as to correspond to the individual songs in the rhythm game, and information related to a party organization that is configured of MV original characters (basic display objects) set in advance (hereinafter, referred to as MV original-party-organization information) is associated with each of the music videos. The MV original-party-organization information is stored in a game-information storage section in association with the song ID, the song data, and the MV data. When the MV original-party-organization reading processing is executed, the MV original-party-organization information is read from the game-information storage section on the basis of the song name information (song ID) shown in FIG. 10. Then, the party organization in the party organization screen, which is shown in FIG. 10, is updated on the basis of the read MV original-party-organization information, and the MV original-party-organization reading processing is completed.

On the other hand, when the close selection operation section 462 is tapped, the MV original-party-organization reading processing is not executed, and the party organization screen, which is shown in FIG. 10, is displayed on the touchscreen 26.

Returning to FIG. 9, in each of the music video display tabs 390, the sound-source selection operation section 390*c* and the order-change selection operation section 390*d* are displayed. When the sound-source selection operation section 390*c* is tapped, a sound-source selecting screen (not shown) is displayed on the touchscreen 26, and the player can customize the sound source of the song according to the player's preference. Furthermore, when the order-change selection operation section 390*d* is vertically swiped while being tapped, the order of the songs in the my MV playlist can be changed, and the position of the tapped music video display tab 390 can be moved to a position where the tapping is released.

Furthermore, a folding-menu operation section 396 is displayed in the my playlist screen, which is shown in FIG. 9. FIG. 9 shows a state in which the folding-menu operation section 396 is folded, and FIG. 15 shows a state in which the folding-menu operation section 396 is unfolded.

Figure 15:
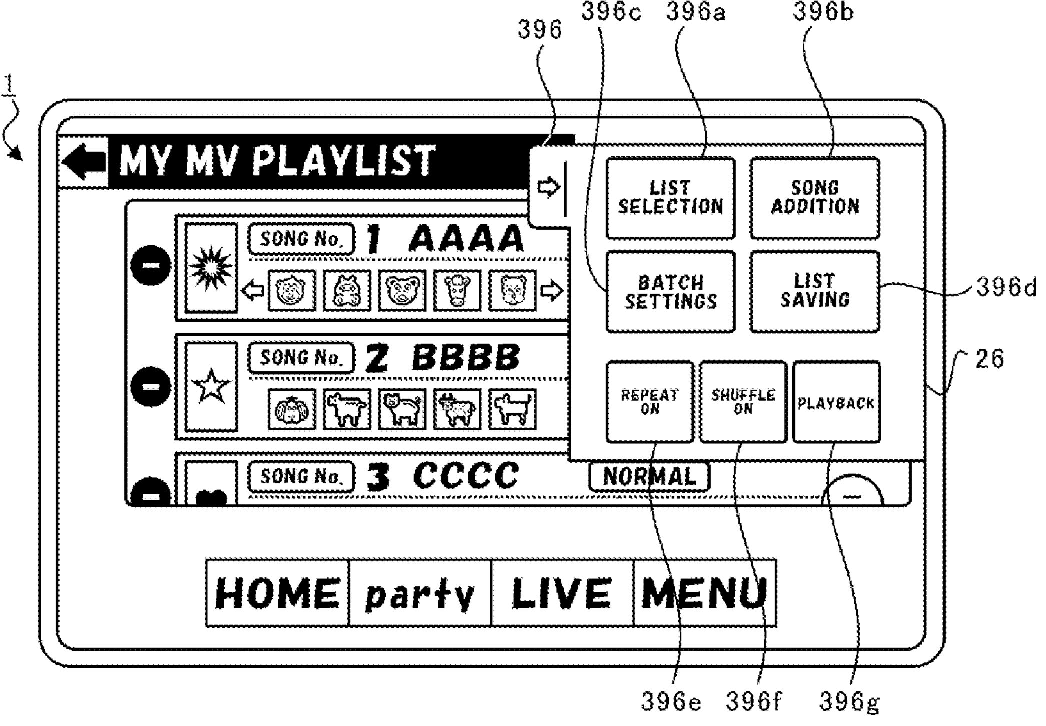
FIG. 15 is a view for explaining an example of a folding-menu operation section 396 in the my-MV-playlist screen.

FIG. 15 is a view for explaining an example of the folding-menu operation section 396 in the my-MV-playlist screen. As shown in FIG. 15, in the folding-menu operation section 396, a list selection operation section 396*a*, a song addition operation section 396*b*, a batch settings operation section 396*c*, a list saving operation section 396*d*, a repeat switch operation section 396*e*, a shuffle switch operation section 396*f*, and a playback selection operation section 396*g* are displayed.

When the list selection operation section 396*a* is tapped, the my-playlist selection screen, which is shown in FIG. 8, is displayed on the touchscreen 26. Furthermore, when the song addition operation section 396*b* is tapped, a song addition screen is displayed on the touchscreen 26.

Figure 16:
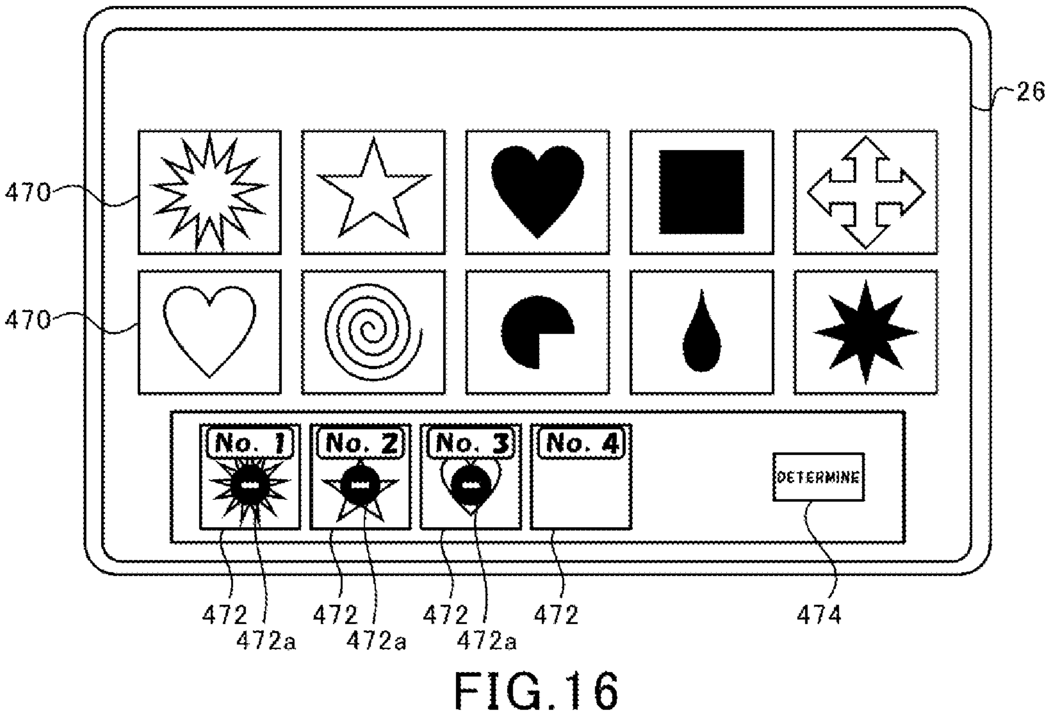
FIG. 16 is a view for explaining an example of a song addition screen.

FIG. 16 is a view for explaining an example of the song addition screen. As shown in FIG. 16, a rhythm-game song list is displayed in the song addition screen. In the rhythm-game song list, a plurality of song identification images 470 are displayed so as to be selectable by the player.

A plurality of song selection frames 472 and a determination selection operation section 474 are displayed below the rhythm-game song list. In the plurality of song selection frames 472, the song order information, which indicates the song order in the my MV playlist, is displayed. Furthermore, the plurality of song selection frames 472 correspond to the song order and the song IDs in the my MV playlist, and images of song IDs that have been already set are displayed therein. A deletion selection operation section 472*a* is displayed in each of the song selection frames 472 in which the song IDs have been set. When the deletion selection operation section 472*a* is tapped, the song ID set in the tapped song selection frame 472 is deleted. In this way, the song ID set in the my MV playlist can be deleted.

The song selection frame 472 in which no song ID is set is blank with no song-ID image being displayed. When any of the song identification images 470 displayed in the rhythm-game song list is tapped with the blank song selection frame 472 being selected, the corresponding song ID is added to that song selection frame 472 and the added song ID is stored in association with the my MV playlist. In this way, the new song ID can be added to the my MV playlist.

When the determination selection operation section 474 is tapped, the song order and the song IDs in the my MV playlist are determined, and the my-MV-playlist screen, which is shown in FIG. 15, is displayed on the touchscreen 26.

Figure 17:
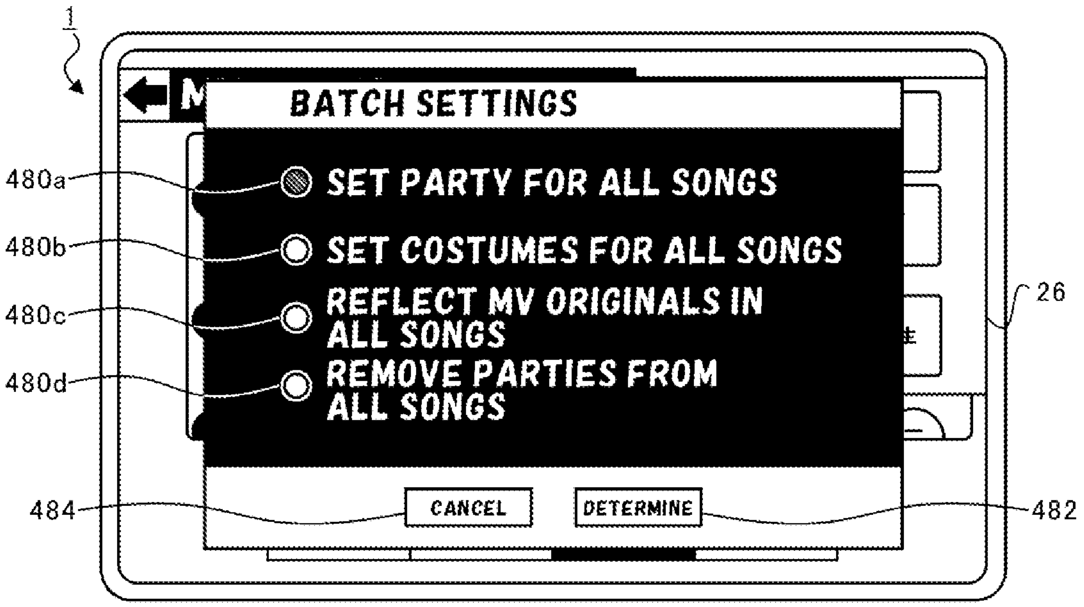
FIG. 17 is a view for explaining an example of a batch settings screen.

In the my-MV-playlist screen, which is shown in FIG. 15, when the batch settings operation section 396*c* is tapped, a batch settings screen shown in FIG. 17 is displayed on the touchscreen 26.

FIG. 17 is a view for explaining an example of the batch settings screen. As shown in FIG. 17, in the batch settings screen, a party batch-settings selection operation section 480*a*, a costume batch-settings selection operation section 480*b*, an MV-original setting selection operation section 480*c*, and a party batch-release selection operation section 480*d* are displayed. Furthermore, in the batch settings screen, a determination selection operation section 482 and a cancel selection operation section 484 are displayed.

Figure 18:
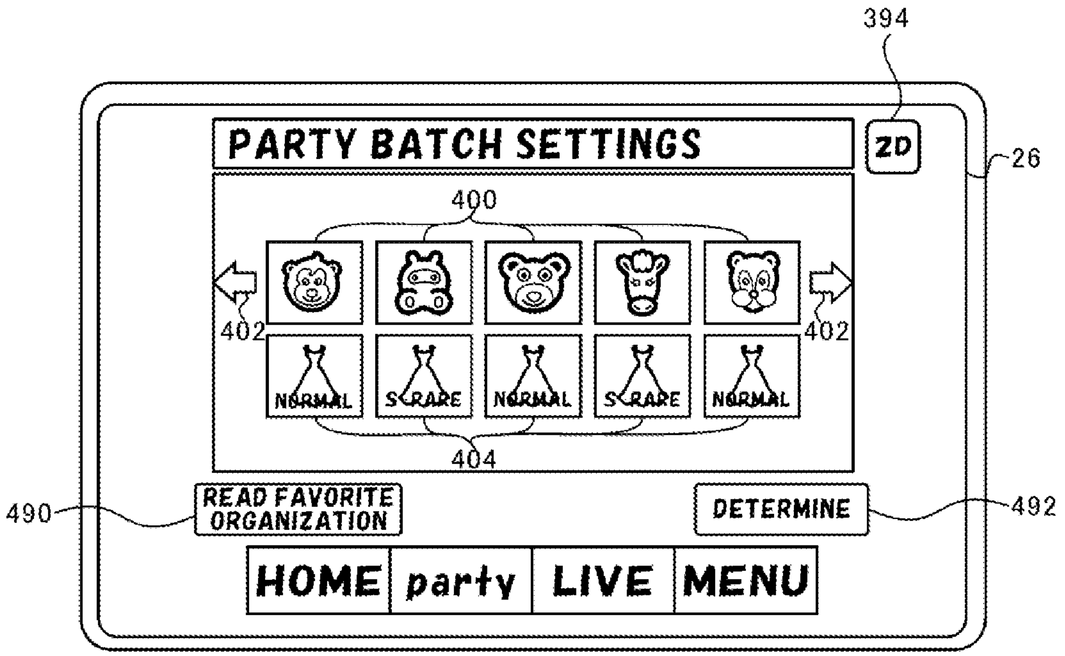
FIG. 18 is a view for explaining an example of a party batch-settings screen.

When the party batch-settings selection operation section 480*a* is tapped, the party batch-settings selection operation section 480*a* is in the selected state, and, when the determination selection operation section 482 is tapped in this state, a party batch-settings screen shown in FIG. 18 is displayed on the touchscreen 26. On the other hand, when the cancel selection operation section 484 is tapped, party batch-settings processing is cancelled, and the my-MV-playlist screen, which is shown in FIG. 15, is displayed on the touchscreen 26.

FIG. 18 is a view for explaining an example of the party batch-settings screen. As shown in FIG. 18, in the party batch-settings screen, the identification images 400 indicating the characters included in the party organization, the switching operation sections 402, and the identification images 404 indicating the costumes are displayed. Furthermore, in the party batch-settings screen, a favorite reading selection operation section 490 and a determination selection operation section 492 are displayed.

When the favorite reading selection operation section 490 is tapped, the favorite-organization reading screen, which is shown in FIG. 14A, is displayed on the touchscreen 26. Then, as described above with reference to FIG. 14A, when the favorite-organization reading processing is executed, the party organization in the party batch-settings screen, which is shown in FIG. 18, is updated on the basis of the read favorite-organization information.

When the determination selection operation section 492 is tapped, the party organization in the party batch-settings screen, which is shown in FIG. 18, is set in a batch manner for all the songs in the my MV playlist. Specifically, the party organization information (the character IDs, the costume IDs, and the organization order information) shown in FIG. 18 is stored in association with all the song IDs in the my MV playlist. Note that the party organization information may include identification information of accessories that can be equipped on the characters (hereinafter, referred to as accessory IDs).

Here, as described above, the forms of a party organization include the normal form and the special form. In the case where the party organization shown in FIG. 18 is in the special form, and the party organization in the special form is set in a batch manner for all the songs, a partial organization of the party organization in the special form is set as a party organization (s) in the normal form, among all the songs. For example, of a party organization in the special form, which is composed of 15 characters, a partial party organization composed of 5 characters that are displayed in the party batch-settings screen, which is shown in FIG. 18, is set as a party organization (s) in the normal form. Alternately, of a party organization in the special form, which is composed of 15 characters, a party organization composed of 5 characters that are not displayed in the party batch-settings screen, which is shown in FIG. 18, may also be set as a party organization (s) in the normal form.

Furthermore, in the case where the party organization shown in FIG. 18 is in the normal form, and the party organization in the normal form is set in a batch manner for all the songs, the party organization in the normal form is set as a part of the party organization in the special form, among all the songs. Then, as the other part of the party organization in the special form, a party organization composed of characters selected at random is set.

Figure 19:
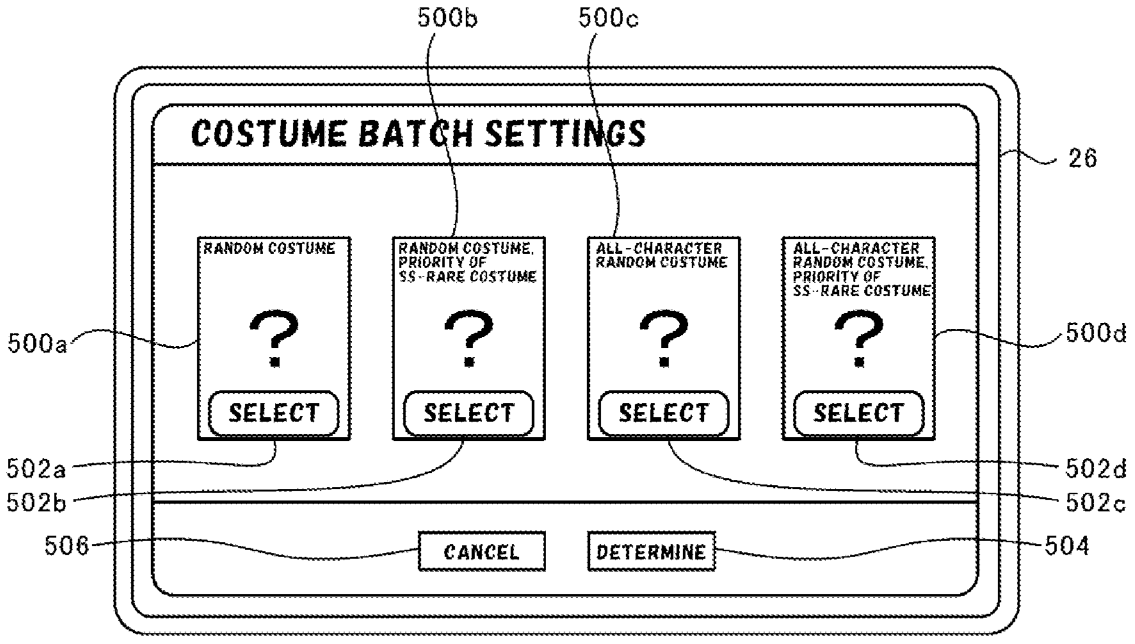
FIG. 19 is a view for explaining an example of a costume batch-settings screen.

Returning to FIG. 17, when the costume batch-settings selection operation section 480*b* is tapped, a costume batch-settings screen shown in FIG. 19 is displayed on the touchscreen 26.

FIG. 19 is a view for explaining an example of the costume batch-settings screen. As shown in FIG. 19, in the costume batch-settings screen, a random costume information tab 500*a*, a random costume priority information tab 500*b*, an all-character random costume information tab 500*c*, and an all-character random costume priority information tab 500*d* are displayed. Furthermore, a determination selection operation section 504 is displayed in the costume batch-settings screen. When the determination selection operation section 504 is tapped, costume batch-settings processing, to be described below, is executed.

The random costume information tab 500*a* indicates that one kind of costume to be displayed in the music videos will be randomly determined. Furthermore, in the random costume information tab 500*a*, a selection operation tab 502*a* is displayed. When the selection operation tab 502*a* is tapped, the random costume information tab 500*a* is in the selected state.

The random costume priority information tab 500*b* indicates that one kind of costume to be displayed in the music videos will be randomly determined, and, in the case where there is a character having a costume ID with high rarity (for example, SS rare), this costume ID will be preferentially determined therefor. Furthermore, in the random costume priority information tab 500*b*, a selection operation tab 502*b* is displayed. When the selection operation tab 502*b* is tapped, the random costume priority information tab 500*b* is in the selected state.

The all-character random costume information tab 500*c* indicates that individual costumes for all the characters to be displayed in the music videos will be randomly determined. Furthermore, in the all-character random costume information tab 500*c*, a selection operation tab 502*c* is displayed. When the selection operation tab 502*c* is tapped, the all-character random costume information tab 500*c* is in the selected state.

The all-character random costume priority information tab 500*d* indicates that costumes for all the characters to be displayed in the music videos will be randomly determined, and, in the case where there is a character having a costume ID with high rarity (for example, SS rare), this costume ID will be preferentially determined therefor. Furthermore, in the all-character random costume priority information tab 500*d*, a selection operation tab 502*d* is displayed. When the selection operation tab 502*d* is tapped, the all-character random costume priority information tab 500*d* is in the selected state.

When the determination selection operation section 504 is tapped with the random costume information tab 500*a* in the selected state, one kind of costume to be displayed in the music videos is randomly determined, and the one kind of costume is set for all the characters. Specifically, the one kind of costume ID is stored in association with all the character IDs.

When the determination selection operation section 504 is tapped with the random costume priority information tab 500*b* in the selected state, one kind of costume to be displayed in the music videos is randomly determined, and the one kind of costume is set for all the characters. At this time, in the case where there is a character having a costume ID with high rarity (for example, SS rare), this costume ID is preferentially set only for that character. Specifically, the costume ID with high rarity is stored in association with the character ID having the costume ID with high rarity, and the one kind of costume ID is stored in association with the other character IDs.

When the determination selection operation section 504 is tapped with the all-character random costume information tab 500*c* in the selected state, individual costumes for all the characters to be displayed in the music videos are randomly determined, and the determined individual costumes are set for all the characters. Specifically, the randomly determined costume IDs are stored in association with the individual character IDs.

When the determination selection operation section 504 is tapped with the all-character random costume priority information tab 500*d* in the selected state, individual costumes for all the characters to be displayed in the music videos are randomly determined, and the determined individual costumes are set for all the characters. At this time, in the case where there is a character having a costume ID with high rarity (for example, SS rare), this costume ID is preferentially set only for that character. Specifically, the costume ID with high rarity is stored in association with the character ID having the costume ID with high rarity, and the randomly determined costume IDs are stored in association with the other character IDs.

On the other hand, when a cancel selection operation section 506 is tapped, the costume batch-settings processing is not performed, and the my-MV-playlist screen, which is shown in FIG. 15, is displayed on the touchscreen 26.

Figure 20:
FIG. 20 is a view for explaining an example of an MV-original reading screen.

Returning to FIG. 17, when the MV-original setting selection operation section 480*c* is tapped, an MV-original reading screen shown in FIG. 20 is displayed on the touchscreen 26.

FIG. 20 is a view for explaining an example of the MV-original reading screen. As shown in FIG. 20, in the MV-original reading screen, a warning sentence is displayed, which indicates that all parties in the my MV playlist will be overwritten when an MV original party is read. Furthermore, a reading selection operation section 510 and a close selection operation section 512, in which “close” is written, are displayed in the MV-original reading screen.

When the reading selection operation section 510 is tapped, the MV original-party-organization reading processing, which has been described with reference to FIG. 14B, is executed. The MV original reading processing is executed for each song in the my MV playlist, and MV original-partyorganization information (basic display object information) set in advance for the music video for each song is set as the party organization information on characters to be displayed in the music video. Here, in the case where the number of characters in an MV original party organization is less than a prescribed number (for example, 5), a randomly selected character (s) may be added thereto to make the number of characters equal to or greater than the prescribed number. Specifically, party additional organization information with which a randomly determined character ID (s) is associated may be set in the MV original-party-organization information, as the party organization information on characters to be displayed in the music video.

On the other hand, when the close selection operation section 512 is tapped, the MV original-party-organization reading processing is not executed, and the my-MV-playlist screen, which is shown in FIG. 15, is displayed on the touchscreen 26.

Figure 21:
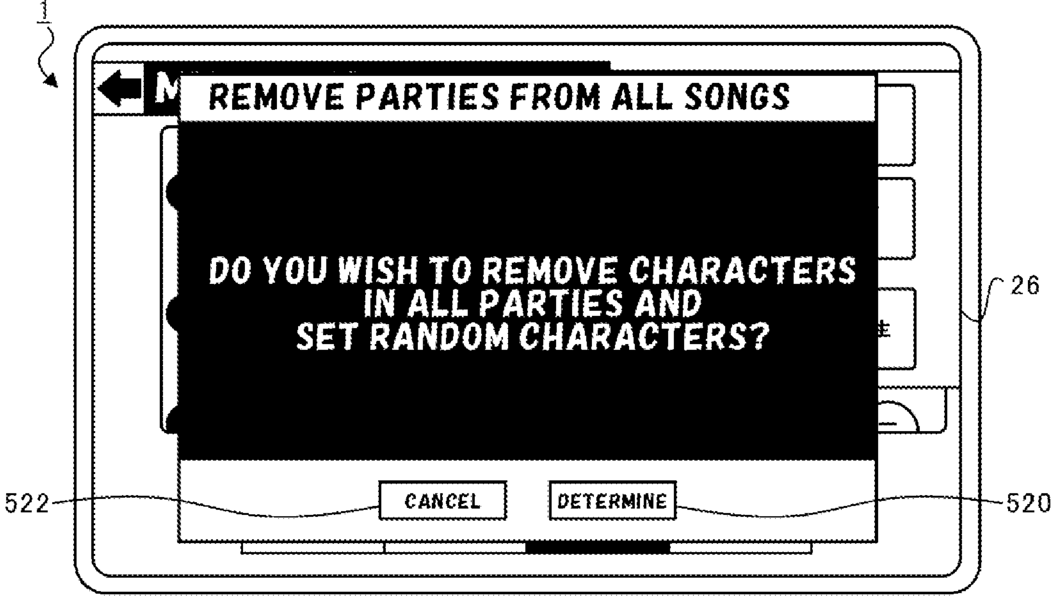
FIG. 21 is a view for explaining an example of a party batch-release screen.

Returning to FIG. 17, when the party batch-release selection operation section 480*d* is tapped, a party batch-release screen shown in FIG. 21 is displayed on the touchscreen 26.

FIG. 21 is a view for explaining an example of the party batch-release screen. As shown in FIG. 21, in the party batch-release screen, a confirmation sentence is displayed, which indicates that all party organizations for all the songs in the my MV playlist will be released, and all party organizations will be composed of randomly selected characters. Furthermore, a determination selection operation section 520 and a cancel selection operation section 522 are displayed in the party batch-release screen.

When the determination selection operation section 520 is tapped, all the party organizations for all the songs in the my MV playlist are released, and random setting processing for setting all the party organizations with randomly selected characters is executed. Specifically, party organization information that is organized with randomly determined character IDs is stored in association with the individual song IDs in the my MV playlist.

When the cancel selection operation section 522 is tapped, party batch release is not executed, and the my-MV-playlist screen, which is shown in FIG. 15, is displayed on the touchscreen 26.

Figure 22:
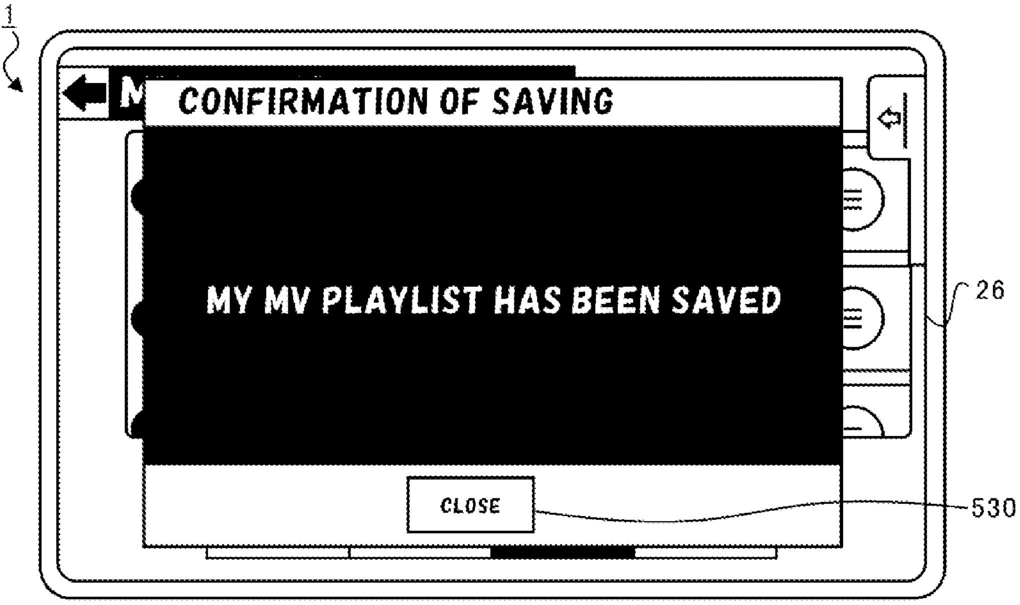
FIG. 22 is a view for explaining an example of a list-saving confirmation screen.

Returning to FIG. 15, when the list saving operation section 396*d* is tapped, my-MV-playlist saving processing is executed, and a list-saving confirmation screen shown in FIG. 22 is displayed on the touchscreen 26.

FIG. 22 is a view for explaining an example of the list-saving confirmation screen. As shown in FIG. 22, in the list-saving confirmation screen, a confirmation sentence indicating that the my MV playlist has been saved is displayed. Furthermore, a close selection operation section 530, in which "close" is written, is displayed in the list-saving confirmation screen.

When the close selection operation section 530 is tapped, saving processing for the my MV playlist is executed, and the my-MV-playlist screen, which is shown in FIG. 15, is displayed on the touchscreen 26.

On the other hand, when the list saving operation section 396*d*, which is shown in FIG. 15, is not tapped, and any of the home-screen selection operation section 300*a*, the party-screen selection operation section 300*b*, the live-screen selection operation section 300*c*, and the menu-screen selection operation section 300*d* of the menu bar 300 is tapped, a screen-transition confirmation screen is displayed on the touchscreen 26.

Figure 23:
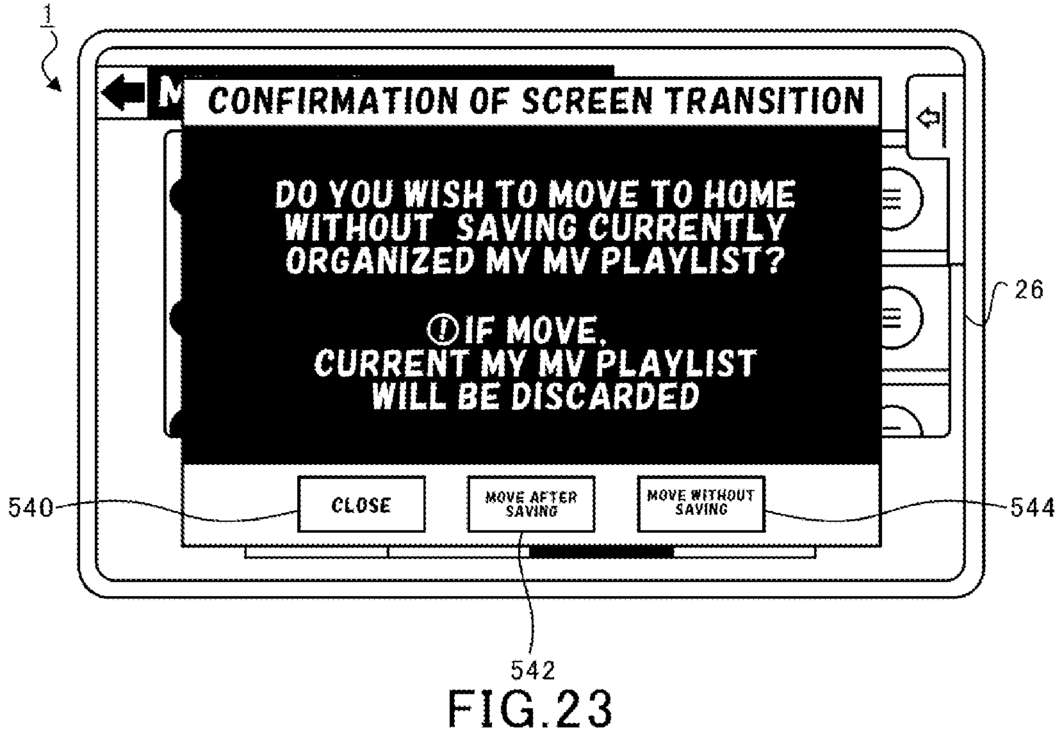
FIG. 23 is a view for explaining an example of a screen-transition confirmation screen.

FIG. 23 is a view for explaining an example of the screen-transition confirmation screen. Here, a description will be given of a case in which the list saving operation section 396*d* is not tapped and in which the home-screen selection operation section 300*a* of the menu bar 300 is tapped. As shown in FIG. 23, in the screen-transition confirmation screen, a warning sentence is displayed, which indicates that, when the screen is transitioned to the home screen without saving the my MV playlist that is currently edited, the current my MV playlist will be discarded. Furthermore, a close selection operation section 540, in which "close" is written, a saving selection operation section 542, in which "move after saving" is written, and a not-saving selection operation section 544, in which "move without saving" is written, are displayed in the screen-transition confirmation screen.

When the close selection operation section 540 is tapped, the screen-transition confirmation screen is closed, and the my-MV-playlist screen, which is shown in FIG. 15, is displayed on the touchscreen 26. Furthermore, when the saving selection operation section 542 is tapped, saving processing for the my MV playlist is executed, and the saving confirmation screen, which is shown in FIG. 22, is displayed on the touchscreen 26. Furthermore, when the not-saving selection operation section 544 is tapped, the screen-transition confirmation screen is closed with the my MV playlist being not saved, and the home screen, which is shown in FIG. 3A, is displayed on the touchscreen 26.

Returning to FIG. 15, when the repeat switch operation section 396*e* is tapped, repeat playback of the my MV playlist is switched between an ON state and an OFF state. Furthermore, when the shuffle switch operation section 396*f* is tapped, shuffle playback of the my MV playlist is switched between an ON state and an OFF state.

Furthermore, when the playback selection operation section 396*g* is tapped, the songs and the music videos for the songs are continuously played back in a synchronized manner following the song order of the my MV playlist. When the touchscreen 26 is tapped during the continuous playback of the songs and the music videos, the song and the music video are paused, and the music-video pause screen is displayed on the touchscreen 26.

Figure 24:
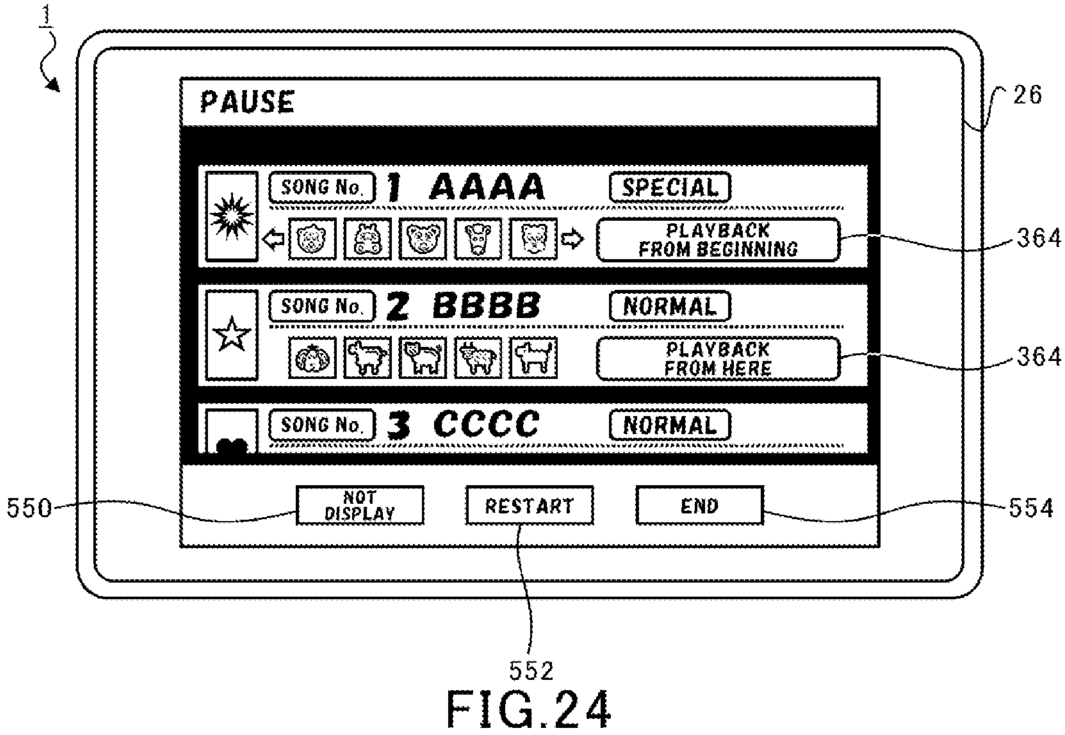
FIG. 24 is a view for explaining an example of a music-video pause screen.

FIG. 24 is a view for explaining an example of the music-video pause screen. As shown in FIG. 24, in the music-video pause screen, the song image information, the song number information, the song name information, the party organization form information, and the party organization information are displayed. Specifically, information related to the songs (the song image information, the song name information, and the party organization form information) is made to correspond to the song IDs in the my MV playlist, and song order information (the song number information) and the party organization information in the my MV playlist are associated with the song IDs in the my MV playlist. When the music video is paused, the music-video pause screen is generated on the basis of these various kinds of information.

In the music-video pause screen, a non-display selection operation section 550, a restart selection operation section 552, and an end selection operation section 554 are displayed. When the non-display selection operation section 550 is tapped, the music-video pause screen is not displayed. When the restart selection operation section 552 is tapped, the song and the music video that have been paused are restarted. When the end selection operation section 554 is tapped, continuous playback of the songs and the music videos is ended, and the my-MV-playlist screen, which is shown in FIG. 15, is displayed on the touchscreen 26.

FIG. 25 is a view for explaining an example of the my MV playlist according to this embodiment. As shown in FIG. 25, the my MV playlist includes the song order information, the song IDs, and the party organization information. One piece of song order information, one song ID, and one piece of party organization information are saved in association with one another in the my MV playlist. The song order information is order information indicating the order of continuous playback of the music videos for the songs corresponding to the song IDs, and indicating the playback order of the songs (the music videos). The song IDs are identification information of songs that can be played back in the rhythm game.

The party organization information includes character position information, character IDs, and costume IDs. The character position information is information indicting organization positions (or organization order) of characters in the party organization. Note that the positions of the characters to be displayed in a music video are determined on the basis of the organization positions of the characters. That is, the positions of the characters to be displayed in a music video change according to the organization positions of the characters. The character IDs are identification information of the characters, and the costume IDs are identification information of costumes that can be worn on the characters.

According to this embodiment, the player can freely change the setting of the song order information, the song IDs, and the party organization information in the my MV playlist. Accordingly, it is possible to generate a player's own my MV playlist according to the player's preference and to freely customize the characters, the party organization, and the costumes to be displayed in the music video for each of the songs in the my MV playlist. As a result, an interest in the game can be improved.

Next, basic configurations and communication processing of the player terminal 1 and the server 100 will be described below. Note that an example of basic communication processing for proceeding with a game will be described here, and a description of the other processing will be omitted.

(Functional Configuration of Player Terminal 1)

Figure 26:
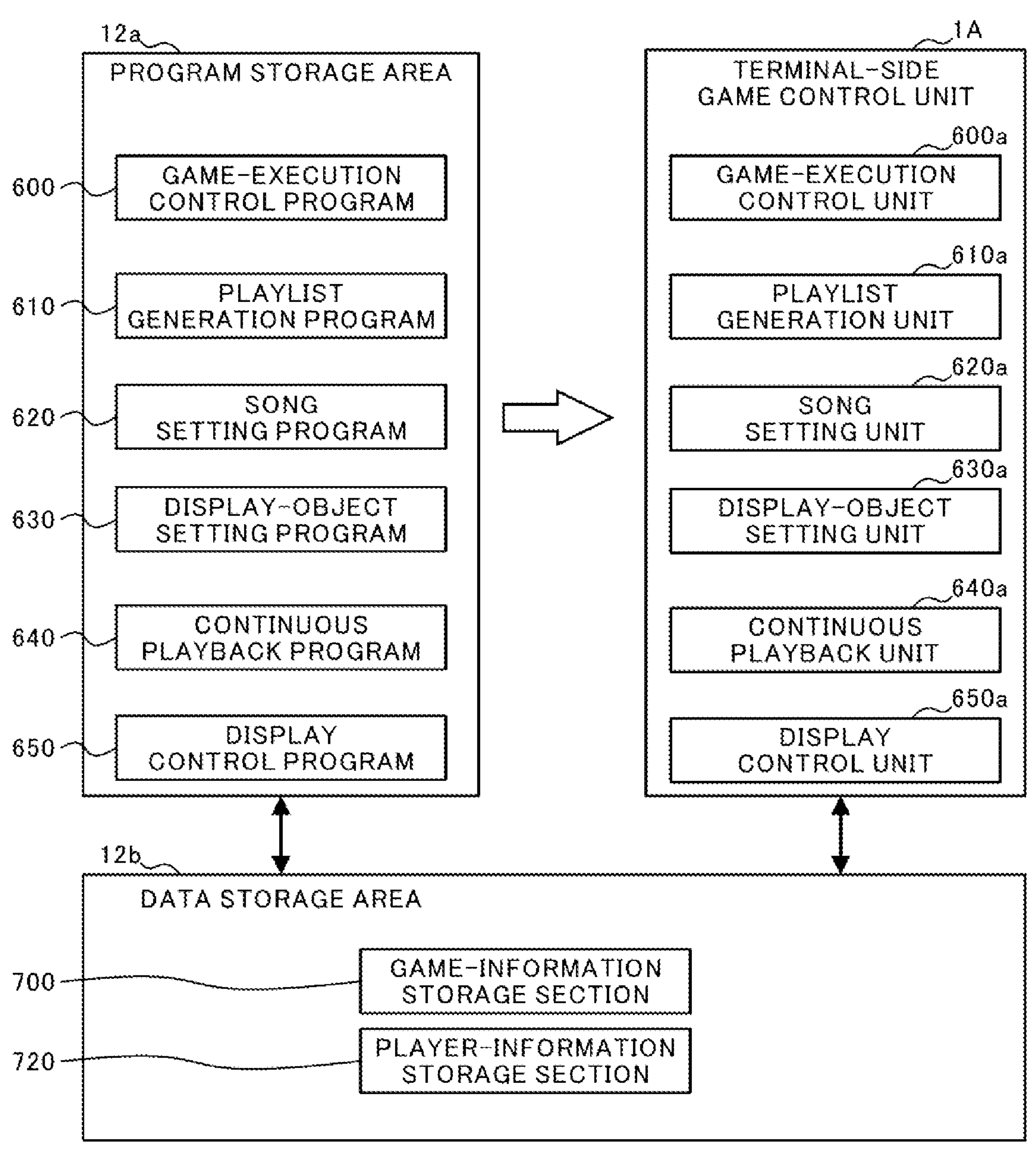
FIG. 26 is a diagram for explaining the configuration of a memory at the player terminal and the function of the player terminal serving as a computer.

FIG. 26 is a diagram for explaining the configuration of the memory 12 at the player terminal 1 and the function of the player terminal 1 serving as a computer. In the memory 12, a program storage area 12*a* and a data storage area 12*b* are provided. When a game is started, the CPU 10 stores terminal-side game control programs (modules) in the program storage area 12*a*.

The terminal-side game control programs include a game-execution control program 600, a playlist generation program 610, a song setting program 620, a display-object setting program 630, a continuous playback program 640, and a display control program 650. Note that the programs listed in FIG. 26 are merely examples, and a large number of other programs are also provided as the terminal-side game control programs.

In the data storage area 12*b*, a game-information storage section 700 and a player-information storage section 710 are provided as storage sections for storing data. Note that the above-mentioned storage sections are merely examples, and a large number of other storage sections are also provided in the data storage area 12*b*.

The CPU 10 runs the individual programs stored in the program storage area 12*a* and updates data in the individual storage sections of the data storage area 12*b*. Then, the CPU 10 runs the individual programs stored in the program storage area 12*a*, thereby causing the player terminal 1 (computer) to function as a terminal-side game control unit 1A. The terminal-side game control unit 1A includes a game-execution control unit 600*a*, a playlist generation unit 610*a*, a song setting unit 620*a*, a display-object setting unit 630*a*, a continuous playback unit 640*a*, and a display control unit 650*a*.

Specifically, the CPU 10 runs the game-execution control program 600, thereby causing the computer to function as the game-execution control unit 600*a*. Similarly, the CPU 10 runs the playlist generation program 610, the song setting program 620, the display-object setting program 630, the continuous playback program 640, and the display control program 650, thereby causing the computer to function as the playlist generation unit 610*a*, the song setting unit 620*a*, the display-object setting unit 630*a*, the continuous playback unit 640*a*, and the display control unit 650*a*, respectively.

The game-execution control unit 600*a* controls the proceeding of the entire game. The game-execution control unit 600*a* sends login information to the server 100 at the time of logging in, for example. Furthermore, in the case where game information about the whole game is updated, the game-execution control unit 600*a* receives the game information from the server 100 and stores the game information in the game-information storage section 700. The game information includes song information and MV data associated with the song IDs.

The playlist generation unit 610*a* generates the my MV playlist shown in FIG. 25 on the basis of a player's operation input. Specifically, the playlist generation unit 610*a* generates the my MV playlist that includes a plurality of pieces of song order information, a plurality of song IDs (song identification information), and a plurality of pieces of party organization information.

The song setting unit 620*a* sets information related to the songs in the my MV playlist on the basis of a player's operation input. Specifically, the song setting unit 620*a* performs setting of the song IDs, setting of the song order, etc., in the my MV playlist.

The display-object setting unit 630*a* sets display object information to be displayed in the music videos for the individual songs in the my MV playlist on the basis of a player's operation input. The display object information includes, for example, the character IDs and the costume IDs of characters that have been organized in a party. Specifically, the display-object setting unit 630*a* sets the display object information (for example, the character IDs, the costume IDs, etc.) in association with each of the plurality of song IDs included in the my MV playlist, on the basis of a player's operation input.

The display-object setting unit 630*a* changes the setting of the plurality of pieces of display object information associated with the plurality of song IDs, on the basis of a first operation input of the player. For example, when the determination selection operation section 520 is tapped (the first operation input) in the party batch-release screen, which is shown in FIG. 21, the currently set party organization information is changed in a batch manner to party organization information that is composed of randomly determined character IDs. Accordingly, the player can enjoy productions different from those in the music videos in the rhythm game, without performing a task of individually setting characters that will appear in the music video for each song.

The display-object setting unit 630*a* sets the identical display object information in association with the plurality of song IDs, on the basis of a second operation input of the player. For example, when the determination selection operation section 492 is tapped (the second operation input) in the party batch-settings screen, which is shown in FIG.

18, the identical party organization information is set in a batch manner in association with all the song IDs in the my MV playlist. Accordingly, the player can set, in a batch manner, a party organization that is composed of favorite characters, as a party organization of characters that will appear in the music videos for the songs, and can omit a task of individually setting a party organization for each of the songs.

The display-object setting unit 630*a* sets, as display object information, basic display object information that is set in advance in association with the plurality of song IDs, on the basis of a third operation input of the player. For example, when the reading selection operation section 510 is tapped (the third operation input) in the MV-original reading screen, which is shown in FIG. 20, MV original-party-organization information (basic display object information) that is set in advance is set in a batch manner for the music videos for the songs in the my MV playlist. Accordingly, the player can easily enjoy productions of the music videos generated especially for the songs in the rhythm game, without performing a task of setting characters that will appear in the music videos for the songs.

The continuous playback unit 640*a* continuously plays back a plurality of songs included in the my MV playlist following the song order of the my MV playlist. Specifically, the continuous playback unit 640*a* continuously plays back song data corresponding to a plurality of song IDs included in the my MV playlist, following the song order of the my MV playlist. The continuous playback unit 640*a* continuously plays back the plurality of pieces of song data on the basis of the song order information, and, in response to the end of playback of each of the songs, performs processing for starting playback of song data in the next playback order. The song data is played back in synchronization with the corresponding music videos (images) controlled by the display control unit 650*a*.

In synchronization with the songs played back by the continuous playback unit 640*a*, the display control unit 650*a* continuously plays back the music videos corresponding to those songs. The display control unit 650*a* performs display control of images to be displayed on the touchscreen 26 at the time of continuous playback of the music videos, on the basis of the my MV playlist. Specifically, the display control unit 650*a* performs display control of images to be displayed on the touchscreen 26 at the time of continuous playback of the music videos, on the basis of the display object information associated with the song IDs in the my MV playlist.

More specifically, the display control unit 650*a* performs display control of images to be displayed on the touchscreen 26, on the basis of song display information on the songs corresponding to the song IDs and display information on the display objects based on the display object information. That is, the display control unit 650*a* performs display control of images to be displayed on the touchscreen 26 by performing real time rendering on the basis of the song display information (background information and motion information) on the songs (music videos) and the display information (character image information and costume image information) on the display objects. Note that, during playback of the music videos, the display objects included in an image that is subjected to real time rendering cannot accept an operation from the player. That is, during playback of the music videos, a viewing game mode in which the player is allowed to just view is set, and an operation with respect to a display object (for example, a character) from the player becomes impossible. Furthermore, an image that is subjected to real time rendering may be a 2D image (2D object image) or a 3D image (3D object image).

Furthermore, when playback of a song is paused during continuous playback of the music videos, the display control unit 650*a* displays, on the touchscreen 26, information related to the song corresponding to the song ID and the display object information associated with this song ID. Specifically, when continuous playback of the music videos is paused, the display control unit 650*a* displays, on the touchscreen 26, information related to the song (the song image information, the song number information, the song name information, and the party organization form information) and the display object information (the party organization information).

(Functional Configuration of Server 100)

Figure 27:
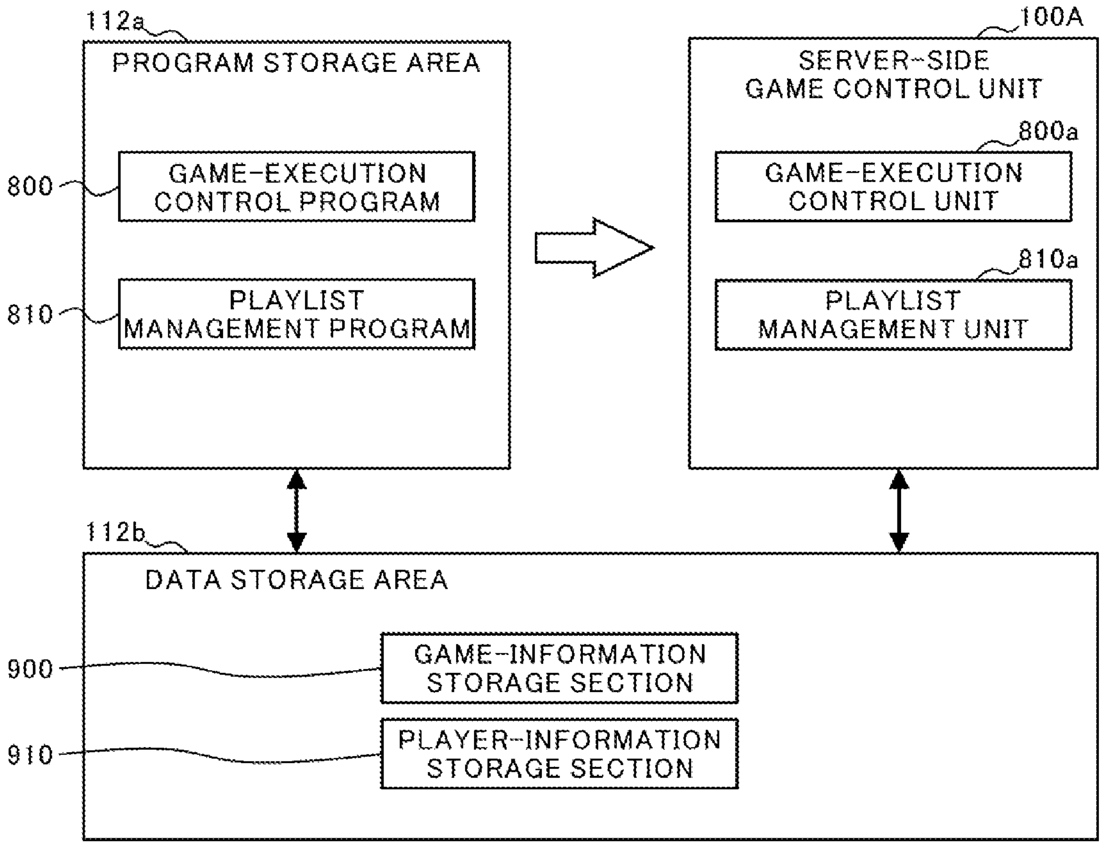
FIG. 27 is a diagram for explaining the configuration of a memory at the server and the function of the server serving as a computer.

FIG. 27 is a diagram for explaining the configuration of the memory 112 at the server 100 and the function of the server 100 serving as a computer. In the memory 112, a program storage area 112*a* and a data storage area 112*b* are provided. When a game is started, the CPU 110 stores server-side game control programs (modules) in the program storage area 112*a*.

The server-side game control programs include a game-execution control program 800 and a playlist management program 810. Note that the programs listed in FIG. 27 are merely examples, and a large number of other programs are also provided as the server-side game control programs.

In the data storage area 112*b*, a game-information storage section 900 and a player-information storage section 910 are provided as storage sections for storing data. Note that the above-mentioned storage sections are merely examples, and a large number of other storage sections are also provided in the data storage area 112*b*.

The CPU 110 runs the individual programs stored in the program storage area 112*a* and updates data in the individual storage sections of the data storage area 112*b*. Then, the CPU 110 runs the individual programs stored in the program storage area 112*a*, thereby causing the server 100 to function as a server-side game control unit 100A. The server-side game control unit 100A includes a game-execution control unit 800*a* and a playlist management unit 810*a*.

Specifically, the CPU 110 runs the game-execution control program 800, thereby causing the computer to function as the game-execution control unit 800*a*. Similarly, the CPU 110 runs the playlist management program 810, thereby causing the computer to function as the playlist management unit 810*a*.

The game-execution control unit 800*a* controls the proceeding of the entire game. When login information, for example, is received from the player terminal 1, the game-execution control unit 800*a* allows the player terminal 1 to download, from the server 100, player information stored in the player-information storage section 910. Furthermore, in the case where game information about the whole game is updated, the game-execution control unit 800*a* reads the updated game information from the game-information storage section 900 and allows the player terminal 1 to download the game information from the server 100.

When information related to the my MV playlist (my-MV-playlist information) is received from the player terminal 1, the playlist management unit 810*a* confirms whether the consistency about the content of the my MV playlist is kept, and performs, if the consistency is kept, processing for saving the my-MV-playlist information in the player-information storage section 910.

(Communication Processing Between Player Terminal 1 and Server 100)

Figure 28:
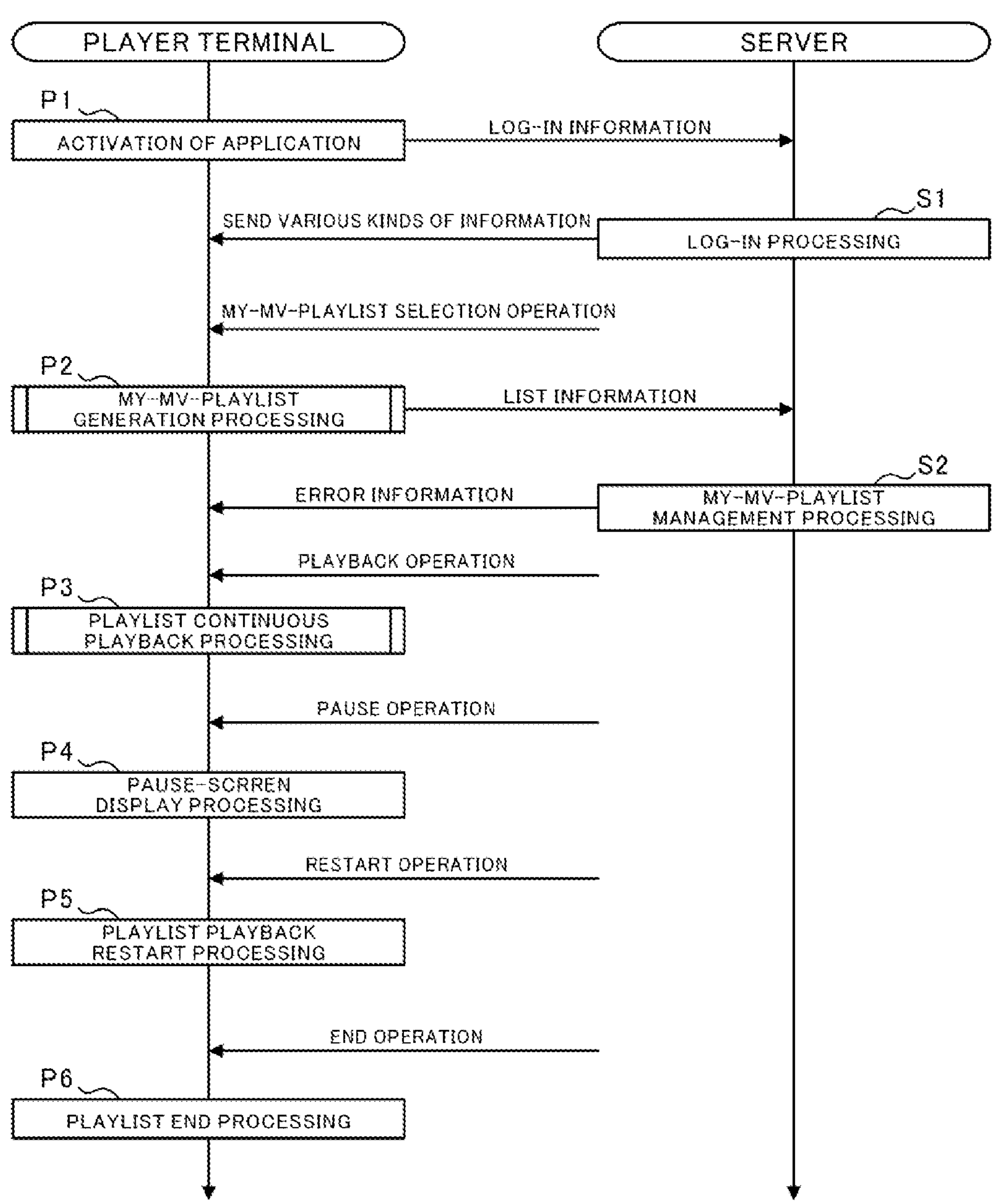
FIG. 28 is a sequence diagram for explaining basic processing at the player terminal and the server.

FIG. 28 is a sequence diagram for explaining basic processing at the player terminal 1 and the server 100. Note that, in the following description, processing carried out at the player terminal 1 is indicated by Pn (n is an arbitrary integer). Furthermore, processing carried out at the server 100 is indicated by Sn (n is an arbitrary integer).

At the player terminal 1, when the player activates a game application (P1), the game-execution control unit 600*a* sends login information to the server 100. When the login information is received, the game-execution control unit 800*a* of the server 100 identifies the player ID associated with the login information to perform login processing (S1). Here, the game-execution control unit 800*a* reads the player information corresponding to the identified player ID and the my-MV-playlist information (hereinafter, also referred to as list information), which is shown in FIG. 25, from the player-information storage section 910 and allows the player terminal 1 to download the player information and the list information from the server 100. Furthermore, in the case where the game information stored in the game-information storage section 900 is changed, the game-execution control unit 800*a* allows the player terminal 1 to download the changed game information from the server 100.

At the player terminal 1, when the playlist selection operation section 380*a* in the my-playlist selection screen, which is shown in FIG. 8, is tapped, the playlist generation unit 610*a* executes my-MV-playlist generation processing (P2).

Figure 29:
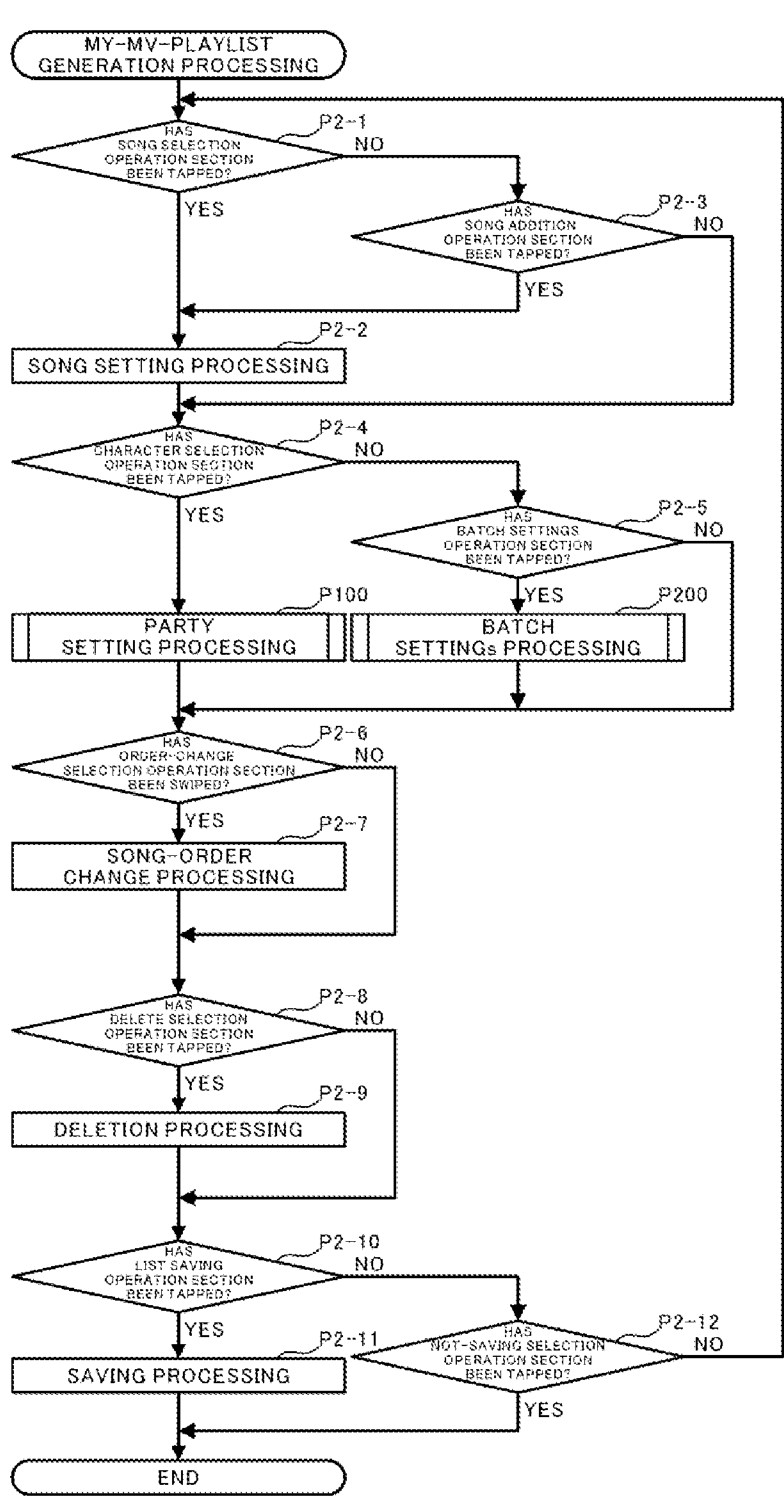
FIG. 29 is a flowchart for explaining an example of my-MV-playlist generation processing.

FIG. 29 is a flowchart for explaining an example of the my-MV-playlist generation processing. As shown in FIG. 29, the song setting unit 620*a* determines whether the song selection operation section 390*a* has been tapped (P2-1). In the case where the song selection operation section 390*a* has been tapped, the song setting unit 620*a* executes song setting processing for setting a song ID in the my MV playlist, in response to a selection operation on the song (song ID) shown in a rhythm-game song list (not shown) (P2-2).

In the case where the song selection operation section 390*a* has not been tapped, the song setting unit 620*a* determines whether the song addition operation section 396*b* has been tapped (P2-3). In the case where the song addition operation section 396*b* has been tapped, the song setting unit 620*a* executes song setting processing for setting a song ID in the my MV playlist, in response to a selection operation on the song (song ID) shown in the rhythm-game song list shown in FIG. 16 (P2-2).

The display-object setting unit 630*a* determines whether the character selection operation section 390*b* has been tapped (P2-4). In the case where the character selection operation section 390*b* has been tapped, the display-object setting unit 630*a* executes party setting processing for setting party organization information in the my MV playlist (P100). The party setting processing will be described later.

In the case where the character selection operation section 390*b* has not been tapped, the display-object setting unit 630*a* determines whether the batch settings operation section 396*c* has been tapped (P2-5). In the case where the batch settings operation section 396*c* has been tapped, the display-object setting unit 630*a* executes batch settings processing (P200). The batch settings processing will be described later.

After the processing of P100 or P200 or in the case of NO in P2-5, the display-object setting unit 630*a* determines whether the order-change selection operation section 390*d* has been swiped (P2-6). In the case where the order-change selection operation section 390*d* has been swiped, the display-object setting unit 630*a* executes song-order change processing for changing the song order in the my MV playlist, in response to the swipe operation on the order-change selection operation section 390*d* (P2-7).

After the processing of P2-7 or in the case of NO in P2-6, the display-object setting unit 630*a* determines whether the delete selection operation section 392 or 472*a* has been tapped (P2-8). When the delete selection operation section 392 or 472*a* has been tapped, the display-object setting unit 630*a* executes deletion processing for deleting the corresponding music video display tab 390 and for deleting the song ID and the party organization information that correspond to the deleted music video display tab 390, from the my MV playlist (P2-9).

After the processing of P2-9 or in the case of NO in P2-8, the display-object setting unit 630*a* determines whether the list saving operation section 396*d* has been tapped (P2-10). In the case where the list saving operation section 396*d* has been tapped, the display-object setting unit 630*a* executes saving processing for saving the my MV playlist in the player-information storage section 710 in association with the player information (P2-11) and ends the my-MV-playlist generation processing.

In the case where the list saving operation section 396*d* has not been tapped, the display-object setting unit 630*a* determines whether the not-saving selection operation section 544 has been tapped (P2-12). In the case where the not-saving selection operation section 544 has been tapped, the display-object setting unit 630*a* ends the my-MV-playlist generation processing without performing the saving processing of P2-11. In the case where the not-saving selection operation section 544 has not been tapped, the flowchart returns to the processing of P2-1.

Figure 30:
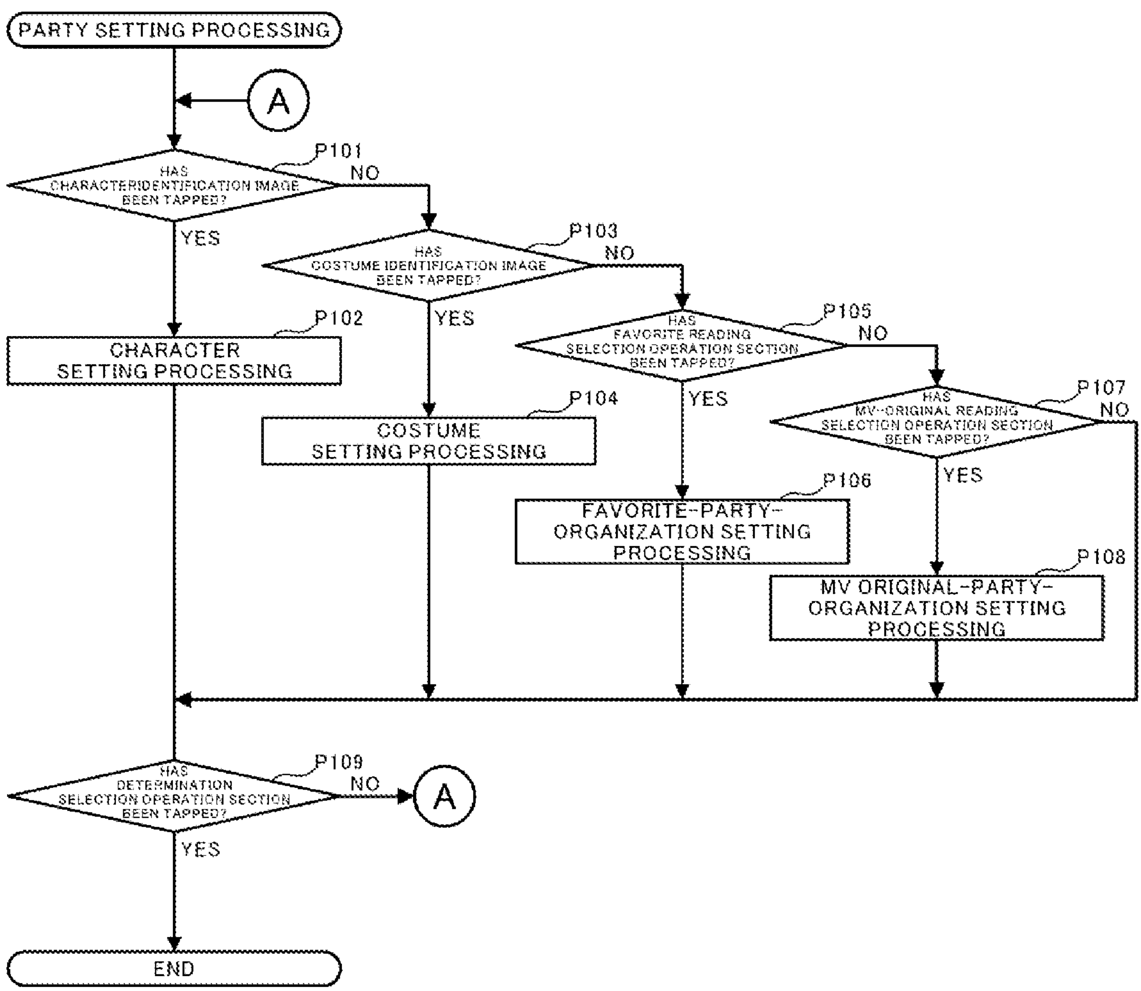
FIG. 30 is a flowchart for explaining an example of party setting processing according to this embodiment.

FIG. 30 is a flowchart for explaining an example of the party setting processing according to this embodiment. As shown in FIG. 30, the display-object setting unit 630*a* determines whether the identification image 400 of any of the characters shown in FIG. 10 has been tapped (P101). In the case where the identification image 400 has been tapped, the display-object setting unit 630*a* executes character setting processing for setting a character to be organized in the party, in response to a selection operation on the character (character ID) in the character list shown in FIG. 11 (P102).

In the case where the identification images 400 has not been tapped, the display-object setting unit 630*a* determines whether the identification image 404 of any of the costumes shown in FIG. 10 has been tapped (P103). In the case where the identification image 404 has been tapped, the display-object setting unit 630*a* executes costume setting processing for setting a costume that serves as an item to be equipped on the character, in response to a selection operation on any of the change tabs 422*a*, 422*b*, and 422*c*, which are shown in FIGS. 12A and 12B (P104).

In the case where the identification image 404 has not been tapped, the display-object setting unit 630*a* determines whether the favorite reading selection operation section 408 has been tapped (P105). In the case where the favorite reading selection operation section 408 has been tapped, the display-object setting unit 630*a* executes favorite-party-organization setting processing for setting a party organization on the basis of the favorite-organization information read in response to a selection operation on the reading selection operation section 452, which is shown in FIG. 14A (P106).

In the case where the favorite reading selection operation section 408 has not been tapped, the display-object setting unit 630*a* determines whether the MV-original reading selection operation section 410 has been tapped (P107). In the case where the MV-original reading selection operation section 410 has been tapped, the display-object setting unit 630*a* executes MV original-party-organization setting processing for setting a party organization on the basis of the MV original-party-organization information read in response to a selection operation on the reading selection operation section 460, which is shown in FIG. 14B (P108).

After the processing of P102, P104, P106, or P108 or in the case where the MV-original reading selection operation section 410 has not been tapped, the display-object setting unit 630*a* determines whether the determination selection operation section 412 has been tapped (P109). In the case where the determination selection operation section 412 has been tapped, the display-object setting unit 630*a* ends party organization processing. On the other hand, in the case where the determination selection operation section 412 has not been tapped, the display-object setting unit 630*a* returns the flowchart to the processing of P101.

Figure 31:
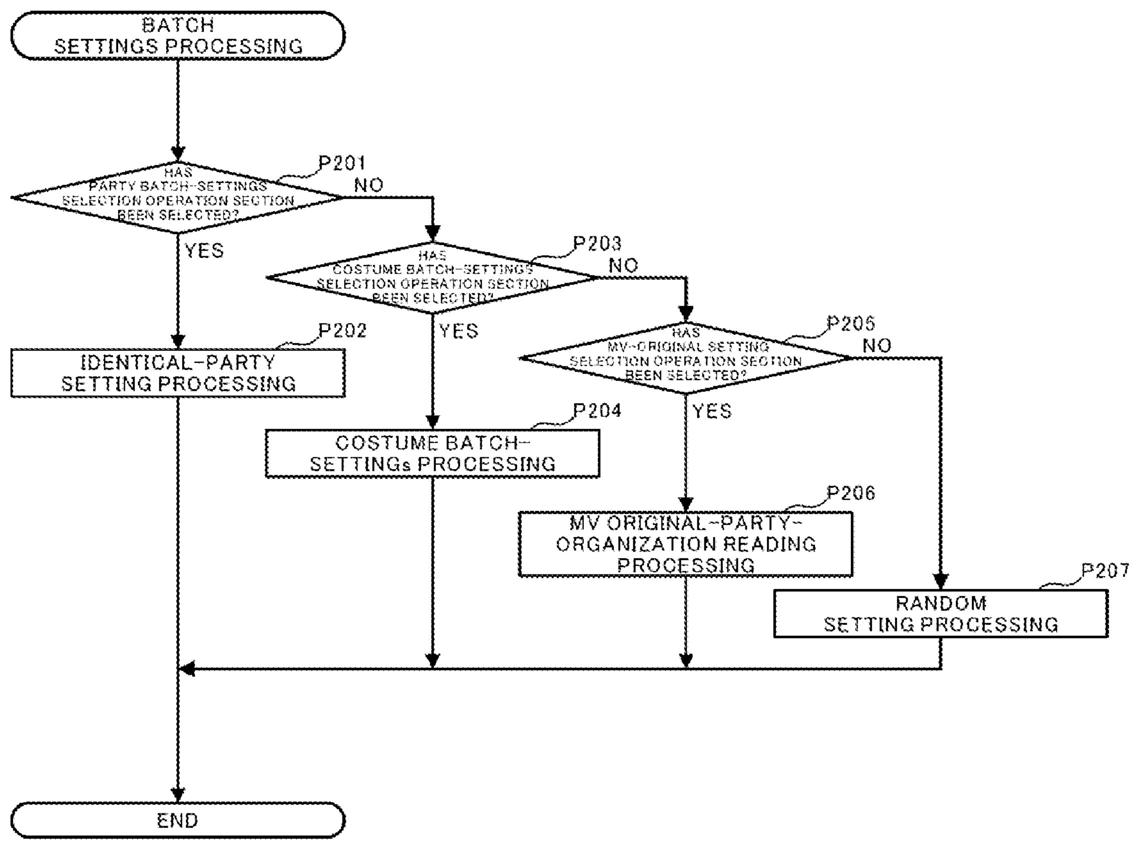
FIG. 31 is a flowchart for explaining an example of batch settings processing according to this embodiment.

FIG. 31 is a flowchart for explaining an example of the batch settings processing according to this embodiment. As shown in FIG. 31, when the determination selection operation section 482, which is shown in FIG. 17, is tapped, the display-object setting unit 630*a* determines which of the party batch-settings selection operation section 480*a*, the costume batch-settings selection operation section 480*b*, the MV-original setting selection operation section 480*c*, and the party batch-release selection operation section 480*d* has been selected.

First, the display-object setting unit 630*a* determines whether the party batch-settings selection operation section 480*a* has been selected (P201). In the case where the party batch-settings selection operation section 480*a* has been selected, the display-object setting unit 630*a* executes identical-party setting processing for associating the party organization information that is currently set in FIG. 18 with all the song IDs in the my MV playlist (P202).

In the case where the party batch-settings selection operation section 480*a* has not been selected, the display-object setting unit 630*a* determines whether the costume batch-settings selection operation section 480*b* has been selected (P203). In the case where the costume batch-settings selection operation section 480*b* has been selected, the display-object setting unit 630*a* executes the costume batch-settings processing, which has been described above with reference to FIG. 19 (P204).

In the case where the costume batch-settings selection operation section 480*b* has not been selected, the display-object setting unit 630*a* determines whether the MV-original setting selection operation section 480*c* has been selected (P205). In the case where the MV-original setting selection operation section 480*c* has been selected, the display-object setting unit 630*a* executes the MV original-party-organization reading processing, which has been described above with reference to FIG. 20 (P206).

In the case where the MV-original setting selection operation section 480*c* has not been selected, the display-object setting unit 630*a* determines that the party batch-release selection operation section 480*d* has been selected, and executes the random setting processing, which has been described above with reference to FIG. 21, (P207) and ends the batch settings processing.

Returning to FIG. 28, when the my MV playlist has been generated, the playlist generation unit 610*a* sends list information related to the generated my MV playlist, to the server 100 (P2). When the list information is received, the playlist management unit 810*a* of the server 100 confirms whether the consistency about the content of the list information is kept, and executes, in the case where the consistency is kept, my-MV-playlist management processing for saving the list information in the player-information storage section 910 in association with the player information (S2). Furthermore, in the case where the consistency about the content of the list information is not kept, the playlist management unit 810*a* discards this list information and allows the player terminal 1 to download, from the server 100, error information indicating that an error has occurred in the list information (S2).

When the playback selection operation section 396*g*, which is shown in FIG. 15, is tapped, the continuous playback unit 640*a* determines that a playback operation has been accepted, and executes playlist continuous playback processing for continuously playing back the music videos for the songs in the rhythm game, on the basis of the my MV playlist generated in P2 (P3).

Figure 32:
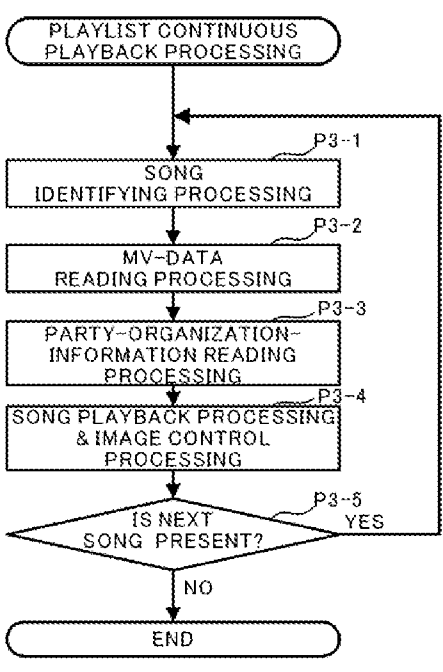
FIG. 32 is a flowchart for explaining an example of playlist continuous playback processing according to this embodiment.

FIG. 32 is a flowchart for explaining an example of the playlist continuous playback processing according to this embodiment. As shown in FIG. 32, the continuous playback unit 640*a* refers to the my MV playlist, which is shown in FIG. 25, and executes song identifying processing for identifying a song to be played back, on the basis of the song order information and the song ID (P3-1).

The display control unit 650*a* refers to the my MV playlist, which is shown in FIG. 25, and executes, on the basis of the song ID of the song identified in P3-1, MV-data reading processing for reading the MV data associated with the song, from the game-information storage section 700 (P3-2).

Furthermore, the display control unit 650*a* executes, on the basis of the song ID of the song identified in P3-1, party-organization-information reading processing for reading the party organization information corresponding to the song, from the my MV playlist (P3-3).

Then, the continuous playback unit 640*a* executes song playback processing for playing back the song data of the song identified in P3-1, and the display control unit 650*a* executes image control processing for generating and controlling an image to be displayed on the touchscreen 26, on the basis of the MV data read in P3-2 and the party organization information read in P3-3 (P3-4). Here, the MV data includes the song display information (information related to a background image, motion information of characters, etc., in the music video). In the image control processing, the display control unit 650*a* performs display control of an image to be displayed on the touchscreen 26 by performing real time rendering by using the character position information, the character IDs, and the costume IDs included in the party organization information and the song display information included in the MV data.

After the end of playback of the song, the continuous playback unit 640*a* determines the presence or absence of a song in the next playback order (P3-5). The presence or absence of a song in the next playback order is determined on the basis of information on the my MV playlist, which is shown in FIG. 25. In the case where there is a song in the next playback order, the continuous playback unit 640*a* returns to the processing of P3-1, and executes the song identifying processing for identifying the song in the next playback order. Furthermore, the display control unit 650*a* executes the processing of P3-2, P3-3, and P3-4 on the basis of the song ID of the identified song and the my MV playlist, which is shown in FIG. 25.

On the other hand, in the case where there is no song in the next playback order, the continuous playback unit 640*a* ends the playlist continuous playback processing.

Returning to FIG. 28, when the touchscreen 26 is tapped during the playlist continuous playback processing, the continuous playback unit 640*a* determines that a pause operation has been accepted, and executes processing for pausing the song (music video) that is being played back. At this time, the display control unit 650*a* executes pause-screen display processing for displaying, on the touchscreen 26, the music-video pause screen, which has been described above with reference to FIG. 24 (P4).

When the restart selection operation section 552, which is shown in FIG. 24, is tapped, the continuous playback unit 640*a* determines that a restart operation has been accepted, and executes playlist playback restart processing for restarting playback of the song (music video) that is being paused (P5).

When the end selection operation section 554, which is shown in FIG. 24, is tapped, or when the last song in the playback order is ended with the repeat function of the my MV playlist being in the OFF state, the continuous playback unit 640*a* determines that an end operation has been accepted, and executes playlist end processing for ending the playlist continuous playback processing (P6).

As described above, in the player terminal 1, the game-execution control program 600, the playlist generation program 610, the song setting program 620, the display-object setting program 630, the continuous playback program 640, and the display control program 650 are provided. Furthermore, the player terminal 1 includes the game-execution control unit 600*a*, the playlist generation unit 610*a*, the song setting unit 620*a*, the display-object setting unit 630*a*, the continuous playback unit 640*a*, and the display control unit 650*a*. However, a portion or the entirety of these programs and functional units may be provided at the server 100. That is, these programs and functional units may be provided at one of or both of the player terminal 1 and the server 100.

Furthermore, in the server 100, the game-execution control program 800 and the playlist management program 810 are provided. Furthermore, the server 100 includes the game-execution control unit 800*a* and the playlist management unit 810*a*. However, a portion or the entirety of these programs and functional units may be provided at the player terminal 1. That is, these programs and functional units may be provided at one of or both of the player terminal 1 and the server 100.

Furthermore, the information processing program in the above-described embodiment may be stored in a computer-readable recording medium and provided in the form of the recording medium. Alternatively, the information processing program in the above-described embodiment may be provided in the form of a player terminal or an information processing system that includes this recording medium. Furthermore, the above-described embodiment may be achieved in the form of an information processing method for realizing the individual functions and the steps shown in the flowcharts.

Although an aspect of the embodiment has been described above with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope of the present invention.

What is claimed is:

1. A non-transitory computer readable medium storing a program causing a computer to execute a method comprising:

displaying, on a display device within a player terminal, a party selection screen for a computer game, wherein the party selection screen displays a plurality of identification images associated with a plurality of game characters, and wherein the party selection screen provides a user interface for selecting a game character from among the plurality of game characters using the plurality of identification images;

receiving, from an input unit within the player terminal, a first operation input from a player for selecting an identification image corresponding to a selected game character among the plurality of game characters in response to displaying the party selection screen;

displaying, on the display device within the player terminal and in response to receiving the first operation input for selecting the identification image associated with the selected game character, a costume selection screen for the computer game, wherein the costume selection screen displays a plurality of images associated with a plurality of costume information tabs;

receiving, from the input unit within the player terminal, a second operation input from the player for selecting a costume information tab among the plurality of costume information tabs in response to displaying the costume selection screen, wherein the costume information tab comprises an image of a selected costume for the selected game character;

generating, within the computer game, a playlist that includes a plurality of pieces of song identification information;

setting, within the computer game, display object information in association with each of the plurality of pieces of song identification information included in the playlist, wherein the display object information comprises a character identifier (ID) associated with the selected game character and a costume ID associated with the selected costume for the selected game character;

continuously playing back, within the computer game, a plurality of songs corresponding to the plurality of pieces of song identification information included in the playlist; and displaying and controlling, on the display device and within the computer game, an image of the selected game character during the continuous playback of the plurality of songs based on the image of the selected costume and the display object information associated with the song identification information.

2. The non-transitory computer readable medium according to claim 1, wherein, in displaying and controlling the image of the selected game character, the image of the selected game character is displayed and controlled based on song display information on the plurality of songs corresponding to the song identification information and display information on a display object based on the display object information.

3. The non-transitory computer readable medium according to claim 1, wherein the playlist includes order information indicating a playback order of the plurality of songs, and wherein, in the continuously playing back of the plurality of songs, the plurality of songs are continuously played back based on the order information, and, upon an end of playback of each of the plurality of songs, playback of a song in a next playback order is started.

4. The non-transitory computer readable medium according to claim 1, wherein, in the setting the display object information, setting of a plurality of pieces of display object information associated with the plurality of pieces of song identification information is changed based on a third operation input of the player.

5. The non-transitory computer readable medium according to claim 1, wherein, in the setting the display object information, identical display object information is set in association with the plurality of pieces of song identification information based on a fourth operation input of the player.

6. The non-transitory computer readable medium according to claim 1, wherein, in the setting the display object information, basic display object information that is set in advance in association with the plurality of pieces of song identification information is set as the display object information, based on a fifth operation input of the player.

7. The non-transitory computer readable medium according to claim 1, wherein, in the displaying and controlling the image of the selected game character, when playback of any of the plurality of songs is paused during the continuous playback, information related to the song corresponding to the song identification information and the display object information associated with the song identification information are displayed on a display device.

8. An information processing method that is executed by one or a plurality of computers, the information processing method comprising:

displaying, on a display device within a player terminal, a party selection screen for a computer game, wherein the party selection screen displays a plurality of identification images associated with a plurality of game characters, and wherein the party selection screen provides a user interface for selecting a game character from among the plurality of game characters using the plurality of identification images;

receiving, from an input unit within the player terminal, a first operation input from a player for selecting an identification image corresponding to a selected game character among the plurality of game characters in response to displaying the party selection screen;

displaying, on the display device within the player terminal and in response to receiving the first operation input for selecting the identification image associated with the selected game character, a costume selection screen for the computer game, wherein the costume selection screen displays a plurality of images associated with a plurality of costume information tabs;

receiving, from the input unit within the player terminal, a second operation input from the player for selecting a costume information tab among the plurality of costume information tabs in response to displaying the costume selection screen, wherein the costume information tab comprises an image of a selected costume for the selected game character;

generating, within the computer game, a playlist that includes a plurality of pieces of song identification information;

setting, within the computer game, display object information in association with each of the plurality of pieces of song identification information included in the playlist, wherein the display object information comprises a character identifier (ID) associated with the selected game character and a costume ID associated with the selected costume for the selected game character;

continuously playing back, within the computer game, a plurality of songs corresponding to the plurality of pieces of song identification information included in the playlist; and displaying and controlling, on a display device and within the computer game, an image of the selected game character during the continuous playback of the plurality of songs based on the image of the selected costume and the display object information associated with the song identification information.

9. An information processing system comprising:

at least one processor; and at least one memory connected to the at least one processor, wherein the at least one memory comprises a program configured to perform a method comprising:

displaying, on a display device within a player terminal, a party selection screen for a computer game, wherein the party selection screen displays a plurality of identification images associated with a plurality of game characters, and wherein the party selection screen provides a user interface for selecting a game character from among the plurality of game characters using the plurality of identification images;

receiving, from an input unit within the player terminal, a first operation input from a player for selecting an identification image corresponding to a selected game character among the plurality of game characters in response to displaying the party selection screen;

displaying, on the display device within the player terminal and in response to receiving the first operation input for selecting the identification image associated with the selected game character, a costume selection screen for the computer game, wherein the costume selection screen displays a plurality of images associated with a plurality of costume information tabs;

receiving, from the input unit within the player terminal, a second operation input from the player for selecting a costume information tab among the plurality of costume information tabs in response to displaying the costume selection screen, wherein the costume information tab comprises an image of a selected costume for the selected game character;

generating, within the computer game, a playlist that includes a plurality of pieces of song identification information;

setting, within the computer game, display object information in association with each of the plurality of pieces of song identification information included in the playlist, wherein the display object information comprises a character identifier (ID) associated with the selected game character and a costume ID associated with the selected costume for the selected game character;

continuously playing back, within the computer game, a plurality of songs corresponding to the plurality of pieces of song identification information included in the playlist; and displaying and controlling, on a display device and within the computer game, an image of the selected game character during the continuous playback of the plurality of songs based on the image of the selected costume and the display object information associated with the song identification information.

* * * * *